United States Patent
Yoshida et al.

(10) Patent No.: US 7,076,720 B1
(45) Date of Patent: Jul. 11, 2006

(54) ENCODING APPARATUS AND DECODING APPARATUS

(75) Inventors: Jun Yoshida, Yokohama (JP); Keiichi Iwamura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/577,980

(22) Filed: May 25, 2000

(30) Foreign Application Priority Data

May 28, 1999 (JP) ................................ 11-149592
Oct. 26, 1999 (JP) ................................ 11-304007

(51) Int. Cl.
 *H03M 13/00* (2006.01)
(52) U.S. Cl. .................... 714/755; 714/786; 714/774; 375/262; 375/267; 375/219
(58) Field of Classification Search ........ 714/794–796, 714/755, 774; 370/343, 335; 375/347, 267, 375/262, 240.27, 219, 149–147; 455/73
See application file for complete search history.

(56) References Cited

U.S. PATENT DOCUMENTS

| | | | |
|---|---|---|---|
| 5,535,140 A | 7/1996 | Iwamura | .................... 364/550 |
| 5,604,752 A | 2/1997 | Iwamura | |
| 5,729,560 A | 3/1998 | Hagenauer et al. | |
| 5,742,620 A | 4/1998 | Iwamura | |
| 6,005,852 A * | 12/1999 | Kokko et al. | ............... 370/329 |
| 6,029,264 A * | 2/2000 | Kobayashi et al. | ......... 714/755 |
| 6,182,264 B1 * | 1/2001 | Ott | ............. 714/774 |
| 6,347,391 B1 * | 2/2002 | Uesugi et al. | ............. 714/795 |
| 6,378,104 B1 * | 4/2002 | Okita | ........................ 714/784 |

FOREIGN PATENT DOCUMENTS

EP 0998789 5/2000

OTHER PUBLICATIONS

Harri Holma et al., "Performance Of FRAMES Non-Spread Mode 1 (WB-TDMA) With Turbo Codes", Vehicular Technology Conference, IEEE, VTC '98, pp. 840-844.

* cited by examiner

*Primary Examiner*—Guy J. Lamarre
(74) *Attorney, Agent, or Firm*—Fitzpatrick, Cella, Harper & Scinto

(57) ABSTRACT

An encoding apparatus includes a first encoding unit adapted to encode inputted data, an interleaving unit adapted to interleave the inputted data, and a second encoding unit adapted to encode an output of the interleaving unit. The encoding apparatus executes a first encoding algorithm using the first encoding unit, and executes a second encoding algorithm using the first encoding unit, the interleaving unit and the second encoding unit. Furthermore, the encoding apparatus shares the first encoding unit when the encoding apparatus executes the first and second encoding algorithms in parallel.

14 Claims, 18 Drawing Sheets

ENCODING APPARATUS AND DECODING APPARATUS

BACKGROUND OF THE INVENTION

1. Field of the Invention

The present invention relates to an information processing apparatus and method, and more particularly to techniques for correcting digital data errors.

2. Related Background Art

Digital data received via a transmission path or digital data read and reproduced from a storage medium such as a floppy disk, a compact disk and a magnetic tape may contain data errors.

One approach to correcting such digital data errors is to use error correction techniques. With error correction techniques, digital data to be transmitted or recorded is encoded with redundancy so that even the digital data contains errors, correct digital data can be recovered.

There are a plurality of types of error correction algorithms for such error correction techniques. These algorithms can be selectively used by considering a digital data type and its error characteristics, a transmission path type and its error characteristics, a storage medium type and its error characteristics, and the like.

In configuring a system which selectively uses a plurality of error correction algorithms, an encoder and a decoder suitable for each algorithm are required to be prepared. In this case, the circuit scale of the whole system becomes large and the cost increases.

In a system which performs error correction encoding of a plurality type of digital data by using a plurality of error correction encoding algorithms, it is necessary to sequentially encode digital data by using an error correction encoding algorithm suitable for each digital data. It is therefore difficult to encode digital data at high speed. This problem is also associated with the decoding side.

SUMMARY OF THE INVENTION

An object of the present invention is to solve the above-described problems.

Another object of the present invention is to realize a plurality of error correction encoding algorithms with ease and at low cost.

Another object of the present invention is to realize a plurality of error correction decoding algorithms with ease and at low cost.

As a preferred embodiment for such objects, the invention discloses an information processing apparatus comprising: (a) a first encoding unit for encoding digital data; (b) an interleaving unit for interleaving the digital data; and (c) a second encoding unit for encoding an output of the interleaving unit, wherein first and second error correction encoding algorithms are executed by sharing the first encoding unit.

As another preferred embodiment, the invention discloses an information processing method comprising: (a) a first encoding step of encoding digital data; (b) an interleaving step of interleaving the digital data; (c) a second encoding step of encoding an output of the interleaving step; and (d) a control step of controlling to make first and second error correction encoding algorithms be executed by sharing the first encoding step.

As another preferred embodiment, the invention discloses an information processing apparatus comprising: (a) a first decoding unit for decoding encoded digital data; (b) a first interleaving unit for interleaving an output of the first decoding unit; (c) a second decoding unit for decoding an output of the first interleaving unit; and (d) a second interleaving unit for interleaving an output of the second decoding unit; wherein first and second error correction decoding algorithms are executed by sharing the first decoding unit.

As another preferred embodiment, the invention discloses an information processing method comprising: (a) a first decoding step of decoding encoded digital data; (b) a first interleaving step of interleaving an output of the first decoding step; (c) a second decoding step of decoding an output of the first interleaving step; (d) a second interleaving step of interleaving an output of the second decoding step; and (e) a control step of making first and second error correction decoding algorithms be executed by sharing the first decoding step.

As another preferred embodiment, the invention discloses an encoding apparatus comprising: (a) a first encoding unit adapted to encode inputted data; (b) an interleaving unit adapted to interleave the inputted data; and (c) a second encoding unit adapted to encode an output of the interleaving unit. The encoding apparatus executes a first encoding algorithm using the first encoding unit, and executes a second encoding algorithm using the first encoding unit, the interleaving unit and the second encoding unit. The encoding apparatus shares the first encoding unit when the encoding apparatus executes the first and second encoding algorithms in parallel.

As another preferred embodiment, the invention discloses a decoding apparatus, comprising: (a) a first decoding unit adapted to decode inputted data; (b) a first interleaving unit adapted to interleave an output of the first decoding unit; (c) a second decoding unit adapted to decode an output of the first interleaving unit; and (d) a second interleaving unit adapted to interleave an output of the second decoding unit. The decoding apparatus executes a first decoding algorithm using the first decoding unit, and executes a second decoding algorithm using the first and second decoding units and the first and second interleaving units. The decoding apparatus shares the first decoding unit when the decoding apparatus executes the first and second decoding algorithms in parallel.

Still other objects of the present invention, and the advantages thereof, will become fully apparent from the following detailed description of the embodiments.

DETAILED DESCRIPTION OF THE PREFERRED EMBODIMENTS

The preferred embodiments of the present invention will now be described in detail hereinafter with reference to the accompanying drawings.

First Embodiment

Figure 1:
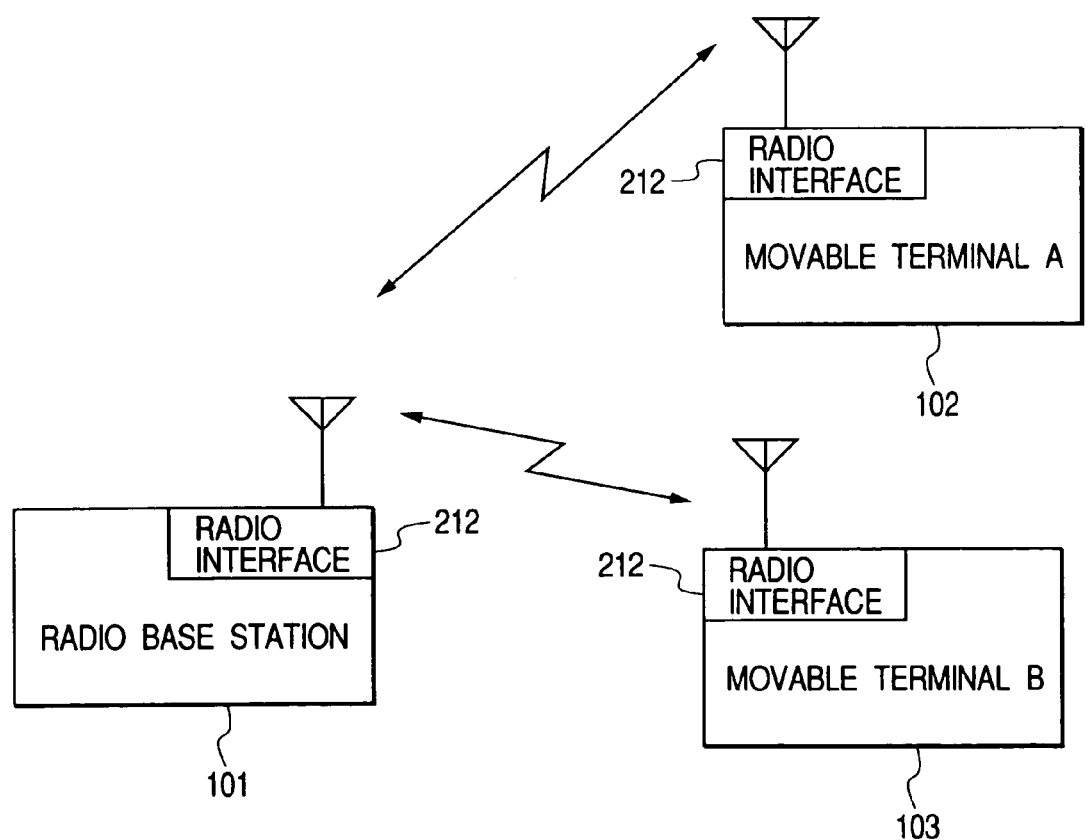
FIG. 1 is a diagram showing an example of a radio communications system according to an embodiment of the invention.

FIG. 1 is a diagram showing an example of a radio communications system according to the embodiment, which system selectively uses a plurality of error correction encoding algorithms and error correction decoding algorithms.

In FIG. 1, reference numeral 101 represents a radio base station, reference numeral 102 represents a movable terminal A, and reference numeral 103 represents a movable terminal B.

Each of the radio base station 101, movable terminal A 102 and movable terminal B 103 has a radio interface 212 of the same type. Each radio interface 212 can conduct radio communications by code division multiple access (CDMA).

CDMA is one of radio communication methods used by mobile communications systems. CDMA provides excellent privacy function and interference resistance, and can realize a larger user subscription capacity and an improved speech quality than a conventional method. With CDMA, the transmission side spread spectrum modulates a modulation wave having the same carrier frequency by using a spread code specific to each transmission line. The reception side code synchronizes each spread code to discriminate between transmission lines and realize multiple access.

In a mobile communications system using CDMA, a plurality type of functional channels are used in order to manage the line states between the base station and movable terminals. Each functional channel has different type and function of digital data to be transmitted. The functional channel includes a user packet channel (hereinafter, UPCH), a transmission channel (hereinafter, TCH), a control channel (hereinafter, CCH) and the like, these channels being radio transmitted time divisionally.

UPCH is a functional channel used for transmitting user defined control data and user data. TCH is a functional channel used for transmitting real time data such as audio and video data, text data, and various program data. CCH is a functional channel used for transferring control data and is constituted of a broadcast channel (hereinafter, BCCH), a common control channel (hereinafter, CCCH) and an ancillary control channel (hereinafter, ACCH).

BCCH is a downlink channel used for broadcasting control data such as channel structure data and system data from the radio base station 101 to the movable terminals A 102 and B 103. CCCH is a functional channel used for transferring necessary connection control data in a link channel establishing process between the radio base station 101 and movable terminal A 102 (or B 103).

CCCH is constituted of a paging channel (hereinafter, PCH) and a selective cell channel (hereinafter, SCCH). PCH is a functional channel used for broadcasting same data from the base station to a plurality of movable terminals in a call service area. SCCH is a functional channel used for transferring data necessary for a call connection to a called movable terminal.

ACCH is a two-directional channel ancillary to TCH and used for transmitting control data necessary for call connection, control data necessary for handoff control, and user packet data. ACCH is constituted of a slow ancillary control channel (hereinafter, SACCH) and a fast ancillary control channel (hereinafter, FACCH).

Various digital data to be transmitted by the functional channels is added with CRC bits, encoded by using an error correction encoding algorithm different for each functional channel, and divided into one or more radio frames which are transmitted time divisionally in the form of radio waves. The encoding algorithm includes a convolutional encoding algorithm and a turbo encoding algorithm to be described later. Digital data to be transmitted by ACCH in particular is convolution-encoded and digital data to be transmitted by TCH in particular is turbo-encoded.

Figure 2:
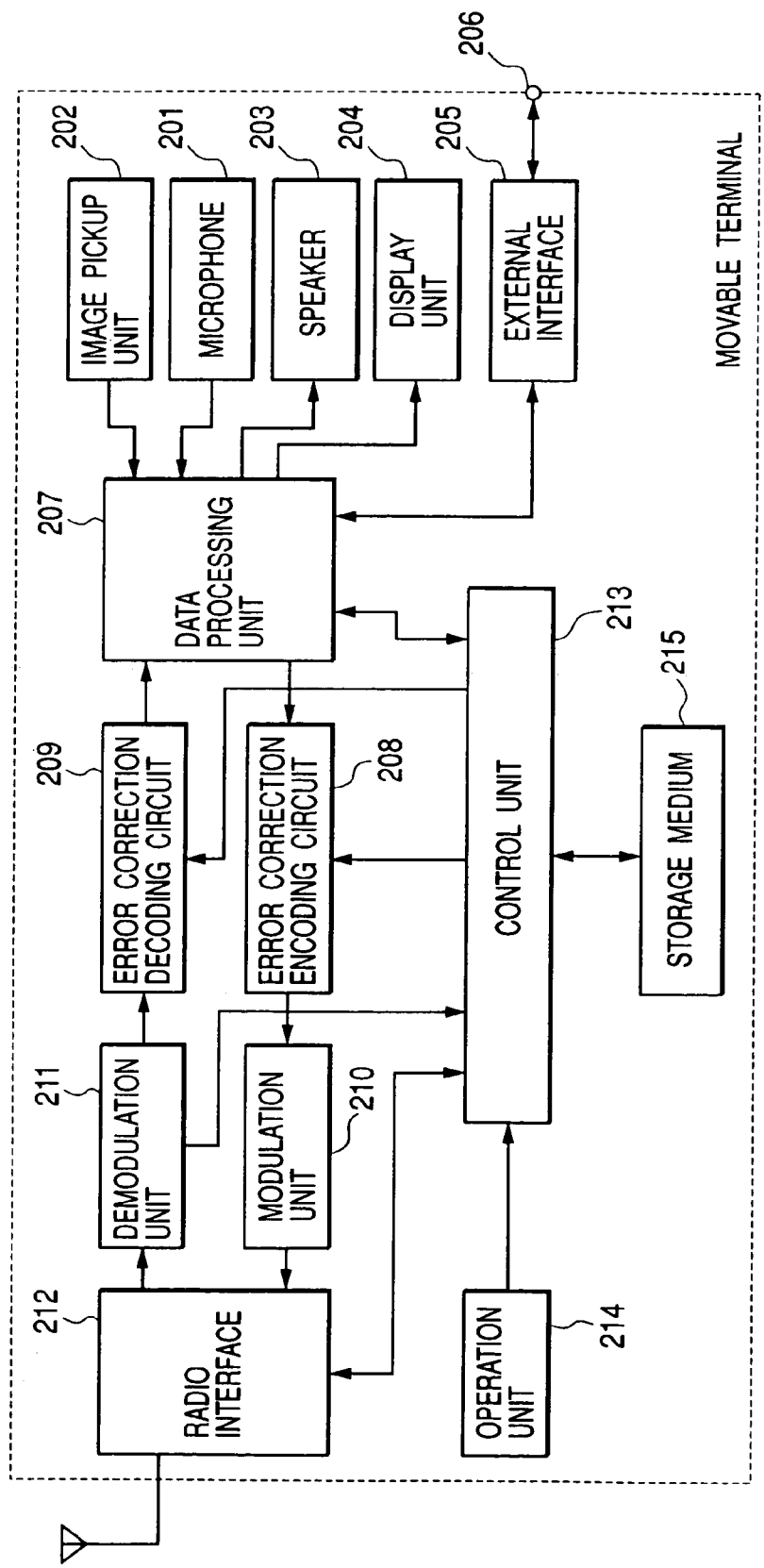
FIG. 2 is a block diagram showing an example of the structure of a movable terminal of the embodiment.

Next, with reference to FIG. 2, an example of the structure of the movable terminal A 102, B 103 will be described. The movable terminal A 102, B 103 is a portable information processing terminal such as a cell phone and a mobile computer.

Reference numeral 201 represents a microphone for inputting external sounds and generating audio data having a predetermined format. Reference numeral 202 represents an image pickup unit for generating video data having a predetermined format from an optical image of a subject. Reference numeral 203 represents a speaker for decoding various audio data and outputting it. Reference numeral 204 represents a display unit for converting text data, video data and the like into a displayable data format and displaying converted data. Reference numeral 205 represents an external interface for managing transfer of text data, video data, audio data, program data and the like to and from the external. Reference numeral 206 represents an input/output terminal.

Reference numeral 207 represents a data processing unit for setting, to the functional channels, digital data such as audio data, video data, text data, and program data supplied from the microphone 201, image pickup unit 202 and external interface 205, and various control data supplied from a control unit 213, and adds CRC bits to each functional channel. The data processing unit 207 converts one or more functional channels supplied from an error correction decoding circuit 209 into audio data, video data, text data, program data, and control data, and selectively supplies them to the speaker 203, display unit 204, external interface 205, and control unit 213.

Reference numeral 208 represents an error correction encoding circuit for executing in parallel a plurality of error correction encoding algorithms including a convolutional encoding algorithm and a turbo encoding algorithm to perform error correction encoding of each functional channel. The error correction decoding circuit 209 executes in parallel a plurality of error correction decoding algorithms including a convolutional decoding algorithm and a turbo decoding algorithm to perform error correction decoding of each functional channel. The detailed structures and operations of the error correction encoding and decoding circuits 208 and 209 will be given later.

Reference numeral 210 represents a modulation unit for digitally modulating an output of the error correction encoding circuit 208. Reference numeral 211 represents a demodulation unit for demodulating an output of a radio interface 212 which receives/transmits radio signals from and to the radio base station 101.

The control unit 213 includes a microcomputer and controls each portion constituting the movable terminal A 102 (or B 103). The control unit 213 realizes parallel processing of a plurality of error correction encoding algorithms by controlling the error correction encoding circuit 208, and also realizes parallel processing of a plurality of error correction decoding algorithms by controlling the error correction decoding circuit 209. Reference numeral 214 represents an operation panel including an operation console with ten-keys and the like. Reference numeral 215 represents a storage medium for storing a plurality type of programs readable by the control unit 213.

Next, the operation of the movable terminal A 102, B 103 will be described.

First, the operation on the transmission side will be described.

The data processing unit 207 adds CRC bits to each functional channel, and thereafter supplies each functional channel to the error correction encoding circuit 208. The error correction encoding circuit 208 performs error correction encoding of each functional channel by selectively using a plurality of error correction encoding algorithms. The error correction encoding algorithm to be used by the error correction encoding circuit 208 is selected by the control unit 213. The control unit 213 makes a selection signal to be supplied to the error correction encoding circuit 208 either active or inactive, in accordance with a transmission rate of digital data to be transmitted by each functional channel.

For error correction encoding of a functional channel which transmits digital data having a high transmission capacity (rate) per unit time, the control unit 213 makes the selection signal active in order to select an error correction encoding algorithm capable of providing a high error correction capability even for a short time decoding process. Such a functional channel is, for example, TCH which transmits digital data (video data, audio data and the like) having a real time nature. One of the error correction encoding algorithms to be selected is a turbo encoding algorithm to be later described, and its corresponding error correction decoding algorithm is a turbo decoding algorithm to be described later.

For error correction encoding of a functional channel which transmits digital data having a low transmission capacity (rate) per unit time, the control unit 213 makes the selection signal inactive in order to select an error correction encoding algorithm which does not require a complicated decoding process. Such a functional channel is, for example, CCH (particularly ACCH) which transmits control data. One of the error correction encoding algorithms to be selected is a convolutional encoding algorithm to be later described, and its corresponding error correction decoding algorithm is a soft output decoding algorithm to be described later.

In accordance with this selection signal, the error correction encoding circuit 208 switches the internal connections to execute selectively or in parallel a plurality of error correction encoding algorithms. The functional channel subjected to error correction encoding is divided into one or more radio frames by the modulation unit 210 and radio interface 212, and transmitted time divisionally as radio waves.

Next, an example of the operation on the reception side will be described.

The demodulating unit 211 checks the frame length of a radio frame constituting one functional channel and notifies the check result to the control unit 213. In accordance with this frame length, the control unit 213 selects an error correction decoding algorithm to be used for decoding the functional channel, and determines whether the selection signal to be supplied to the error correction decoding circuit 209 is active or inactive.

In accordance with this selection signal, the error correction decoding circuit 209 changes the internal connections to selectively execute a plurality of error correction decoding algorithms and decode a plurality of functional channels or to execute in parallel a plurality of error correction decoding algorithms and decode a plurality of functional channels time divisionally at the same time. For example, in decoding ACCH which is one type of CCH, the control unit 213 makes the selection signal inactive to select a soft output decoding algorithm. In decoding TCH, the control unit 213 makes the selection signal active to select a turbo decoding algorithm.

The data processing unit 207 checks CRC bits of the decoded result, and the control unit 213 judges from the check result whether the decoded result is correct. If not correct, the error correction decoding circuit 209 decodes again the functional channel by using another error correction encoding algorithm.

With the above-described control, a functional channel encoded by any one of a plurality of error correction encoding algorithms and transmitted as radio waves can be decoded correctly.

Next, another example of the operation on the reception side will be described.

The decoding unit 211 stores each functional channel constituted of one or more radio frames in a buffer, and sequentially supplies each functional channel to the error correction decoding circuit 209. In accordance with a selection signal, the error correction decoding circuit 209 changes the internal connections to decode each functional channel selectively or in parallel by using a plurality of error correction decoding algorithms. The decode result by each decoding algorithm is supplied to the data processing unit 207. The data processing unit 207 checks CRC bits of each decoded result, and the control unit 213 judges from the check result which decoded result is correct. If it is judged that all decoded results are incorrect, the control unit 213 judges that the functional channel was not received correctly, and issues a re-transmission request to the radio base station 101.

For example, if one functional channel is decoded in parallel by using both a Viterbi decoding algorithm and a turbo decoding algorithm, the data processing unit 207 checks CRC bits of the decoded result obtained by each decoding algorithm. If it is judged that the decoded result by the Viterbi decoding algorithm is correct and the decoded result by the turbo decoding algorithm is incorrect, then the decoded result by the Viterbi decoding algorithm is selected. With such a control, a radio packet encoded by any one of a plurality of error correction encoding algorithms and transmitted as radio waves can be decoded correctly.

Next, a plurality of error correction encoding algorithms realized by the error correction encoding circuit 208 and a plurality of error correction decoding algorithms realized by the error correction decoding circuit 209, will be described.

(1) Convolutional Encoding Algorithm

Figure 3A:
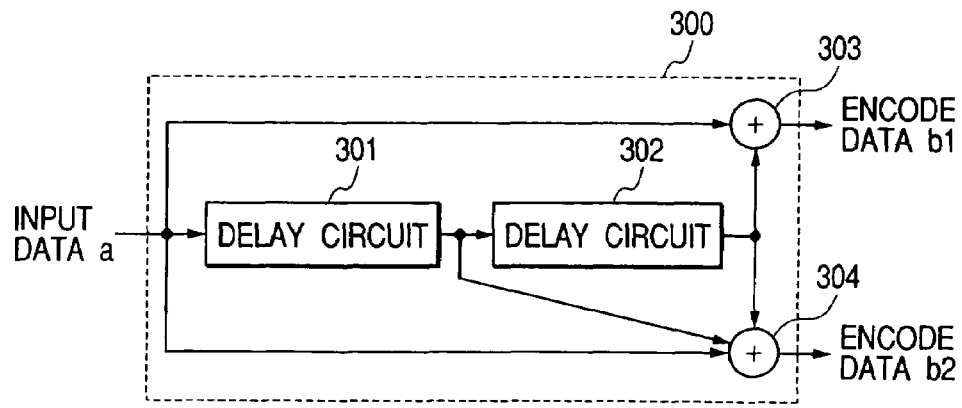
FIGS. 3A and 3B are block diagrams showing examples of a circuit realizing a convolutional encoding algorithm.
Figure 3B:
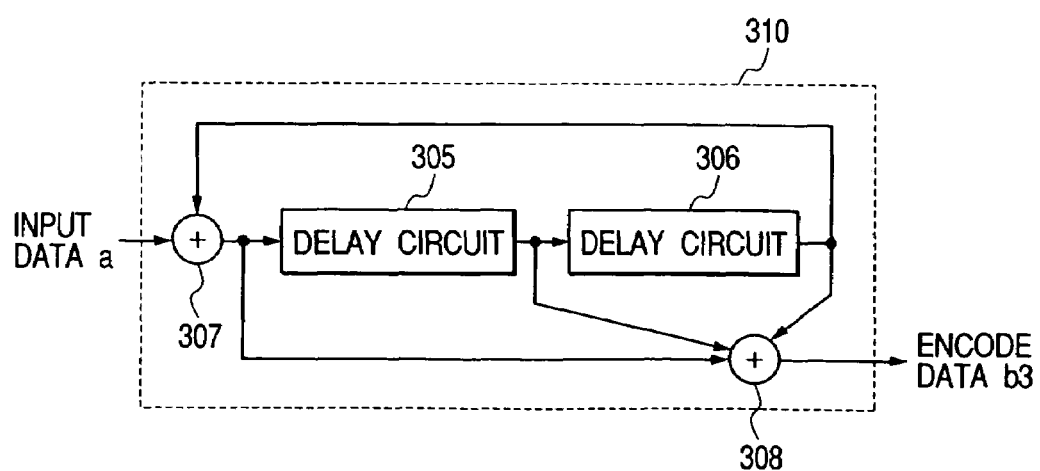

FIGS. 3A and 3B are diagrams illustrating examples of a convolutional encoding algorithm which is one type of an error correction encoding algorithm.

With convolutional encoding, encoded data is output which is influenced not only by a bit train input at one timing but also by a bit train input at another timing before the one timing.

FIG. 3A is a block diagram showing an example of an error correction encoding circuit realizing a non-recursive convolutional encoding algorithm. This circuit 300 is constituted of one unit time delay circuits 301 and 302 and mod 2 adders 303 and 304.

The convolutional encoding circuit 300 supplies digital data input in the unit of a plurality of bits to the adders 303 and 304 as input data a. The adder 303 outputs a sum of the input data a and an output of the delay circuit 302 as encoded data b1. The adder 304 outputs a sum of the input data a and outputs of the delay circuits 301 and 302 as encoded data b2.

FIG. 3B is a block diagram showing an example of an error correction encoding circuit realizing a recursive convolutional encoding algorithm. This circuit 310 is constituted of one unit time delay circuits 305 and 306 and mod 2 adders 307 and 308. This circuit 310 is called a recursive convolutional encoding circuit and used with two encoding circuits to be described later for realizing the turbo encoding algorithm.

The recursive convolutional encoding circuit 310 supplies digital data input in the unit of a plurality of bits to the adder 307 as input data a. The adder 307 calculates a sum (i.e., feedback sum) of the input data a and an output of the delay circuit 306, and inputs the calculated sum to the delay circuit 305 and adder 308. The adder 308 adds the feedback sum of the adder 307 and outputs of the delay circuits 305 and 306 and outputs the result as encoded data b3.

(2) Soft Output Decoding Algorithm

Figure 4:
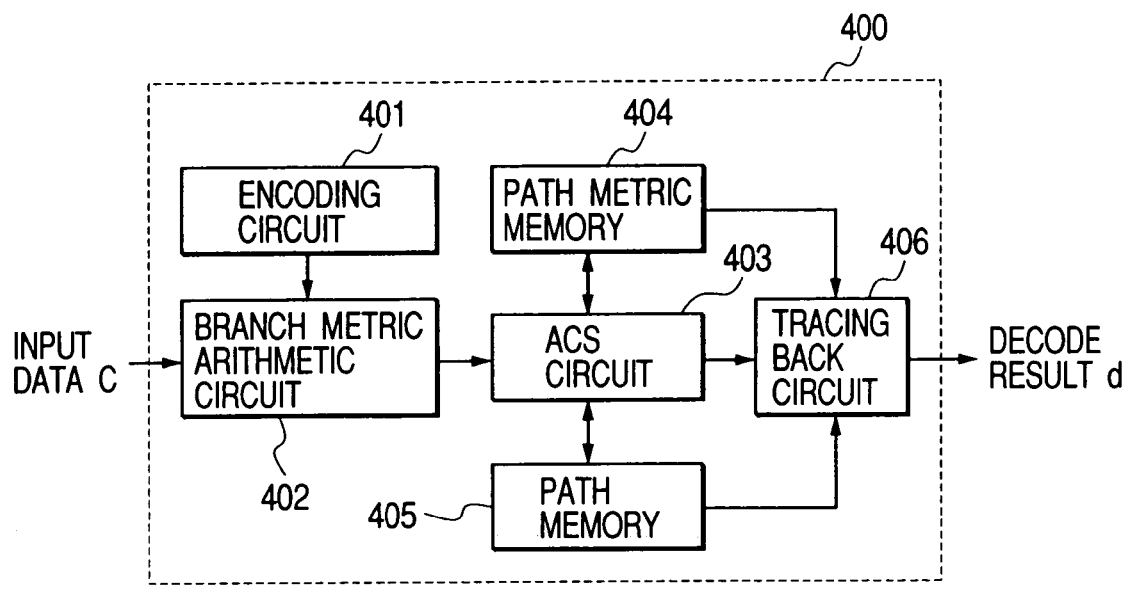
FIG. 4 is a block diagram showing an example of a circuit realizing a soft output decoding algorithm.

FIG. 4 is a block diagram showing an example of an error correction decoding circuit realizing a soft output decoding algorithm which is one type of error correction decoding algorithm. In the following, the structure and operation of the decoding circuit 400 will be described by taking as an example a soft input/output Viterbi decoding algorithm which is one type of soft output decoding algorithm.

The soft output decoding circuit 400 is constituted of: an encoding circuit 401; a branch metric arithmetic circuit 402 for calculating a branch metric representative of a correlation intensity value between a code bit generated by the encoding circuit 401 and input data c; an add-compare-select (ACS) circuit 403; a path metric memory 404 for storing path metric values of all paths; a path memory 405 for storing pass selection data representative of a survival path selected by the ACS circuit 403; and a tracing back circuit 406 for comparing the maximum probability path and a competitive path competitive with the maximum probability path and generating probability data of the maximum probability path.

Next, the operation of the decoding circuit shown in FIG. 4 will be described.

The branch metric arithmetic circuit 402 compares an output of the encoding circuit 401 with the input data c every one unit time, to obtain a branch metric of each branch. The ACS circuit 403 adds a state metric in a past state to a branch metric of a branch from the past state to a present state, to obtain a path metric of the path leading to the present state. This arithmetic result is stored in the path metric memory 404.

The ACS circuit 403 also compares path metric values of a plurality of paths leading to respective states, and selects a path (i.e., survival path) having the strongest correlation with the input data c. The path metric of the selected survival path is stored in the path metric memory 404, and path selection data representative of the survival path is stored in the path memory 405. The path metric values of the survival path and other unselected paths are stored in the path metric memory 404. The ACS circuit 403 eventually decides the path (i.e., maximum probability path) which is assumed to have the strongest correlation at one timing.

The tracing back circuit 406 traces the maximum probability path by using the path selection data stored in the path memory 405, compares the path metric of the maximum probability path with the path metric of the competitive path with the maximum probability path, and calculates the probability degree of the maximum probability path. For example, the probability degree is calculated as a sum of halves of differences between path metric values at respective timings. The tracing back circuit 406 outputs a product of the maximum probability path and the probability degree as a decoded result d.

The soft output decoding circuit shown in FIG. 4 is only illustrative and the embodiment is not limited only thereto. For example, the encoding circuit 401 may be realized by a table storing correspondence data of input/output of the encoding circuit 401.

(3) Turbo Encoding Algorithm

Figure 5:
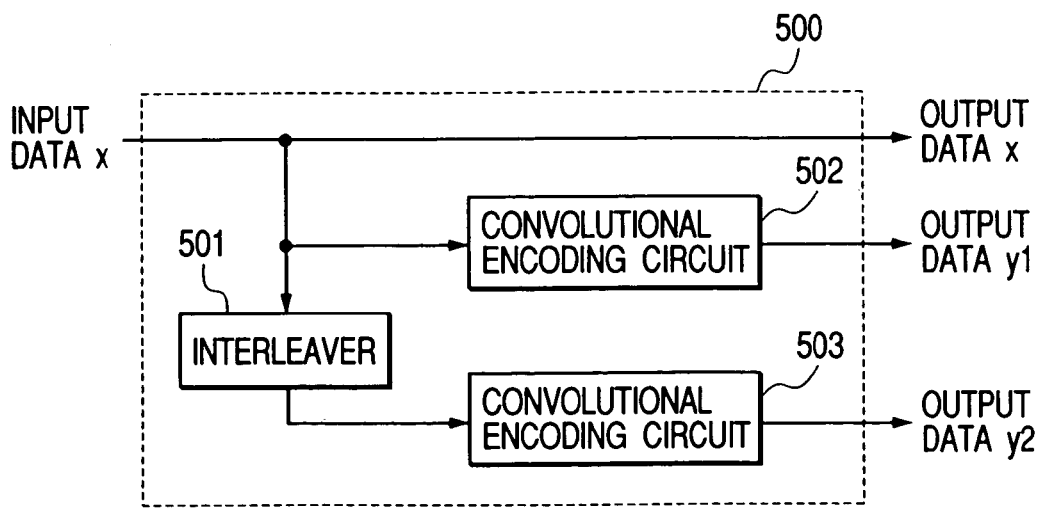
FIG. 5 is a block diagram showing an example of a circuit realizing a turbo encoding decoding algorithm.

FIG. 5 is a block diagram showing an example of an error correction encoding circuit realizing a turbo encoding algorithm which is one type of error correction encoding algorithm. This circuit 500 is constituted of an interleaver 501 for interleaving input data x randomly or in accordance with a predetermined rule, and convolutional encoding circuits 502 and 503. The convolutional encoding circuits 502 and 503 use, for example, the recursive convolutional encoding circuit 310 shown in FIG. 3B.

The turbo encoding circuit 500 converts input digital data having a plurality of bits into three output data (x, y1 and y2 shown in FIG. 5). These three output data are (a) the input data x directly output (i.e., output data x), (b) the input data x convolution-encoded (i.e., output data y1), and (c) the input data x whose bit order was interleaved by the interleaver 501 and convolution-encoded (i.e., output data y2). A data train of these three output data becomes turbo encoded data. The turbo encoding algorithm is resistant to a state (i.e., fading) that a radio wave intensity changes greatly, and is most suitable for a mobile communications system such as a radio communications system of this embodiment.

(4) Turbo Decoding Algorithm

Figure 6:
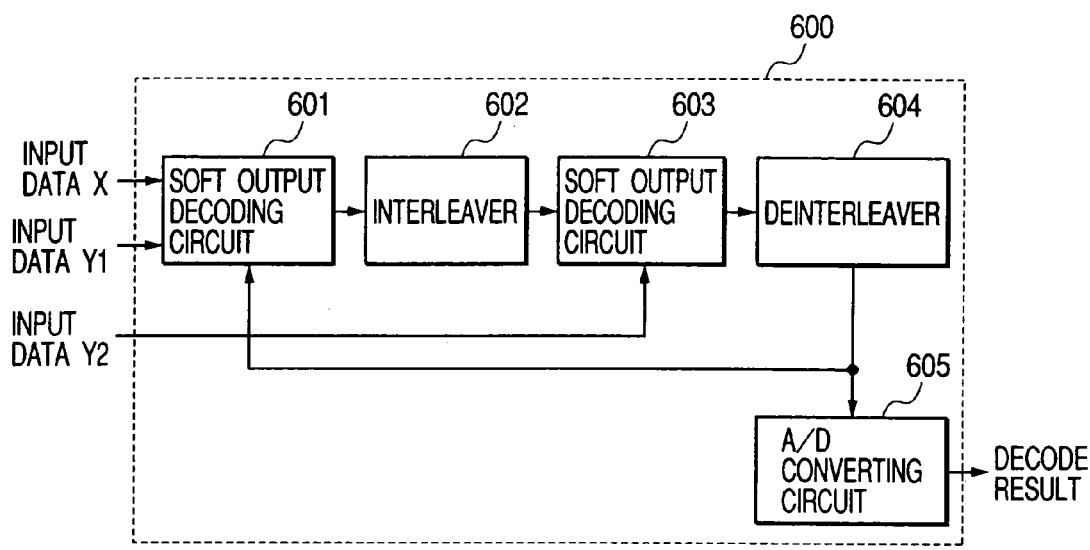
FIG. 6 is a block diagram showing an example of a circuit realizing a turbo decoding algorithm.

FIG. 6 is a block diagram showing an example of an error correction decoding circuit realizing a turbo decoding algorithm which is one type of error correction decoding algorithm. This circuit 600 is constituted of: soft output decoding circuits 601 and 603 for soft-output decoding input data by using the above-described soft output decoding algorithm or the like; an interleaver 602 for interleaving an output of the soft output decoding circuit 601 randomly or in accordance with a predetermined rule; a deinterleaver 604 corresponding to the interleaver 602, and an analog/digital converting circuit (A/D converting circuit) 605.

Each of the soft output decoding circuits 601 and 603 performs a metric calculation by using, as input data, analog values or digital values digitalized into three or more values, obtains a value (probability degree) representative of a probability that each decoded bit is "1" (or "0"), and outputs the decoded result containing the probability degree.

Referring to FIG. 6, turbo encoded data (i.e., input series X, Y1 and Y2) received or read from a storage medium is input to the turbo decoding circuit 600. The input series X, Y1 and Y2 correspond to the output series x, y1 and y1 shown in FIG. 5.

The input series X and Y1 are supplied to the soft output decoding circuit 601 and decoded. The interleaver 602 interleaves the decoded result of the soft output decoding circuit 601, and supplies the interleaved result to the soft output decoding circuit 603. The soft output decoding circuit 603 performs soft output decoding by using the output of the interleaver 602 and the input series Y2, deinterleaves the decoded result, and supplies the deinterleaved result to the soft output decoding circuit 601.

The turbo decoding circuit 600 repeats this process a predetermined number of times and thereafter supplies an output of the deinterleaver 604 to the A/D converting circuit 605 which binarizes the input data and outputs the result as the decoded input series X, Y1 and Y2 (i.e., turbo encoded data).

Figure 7:
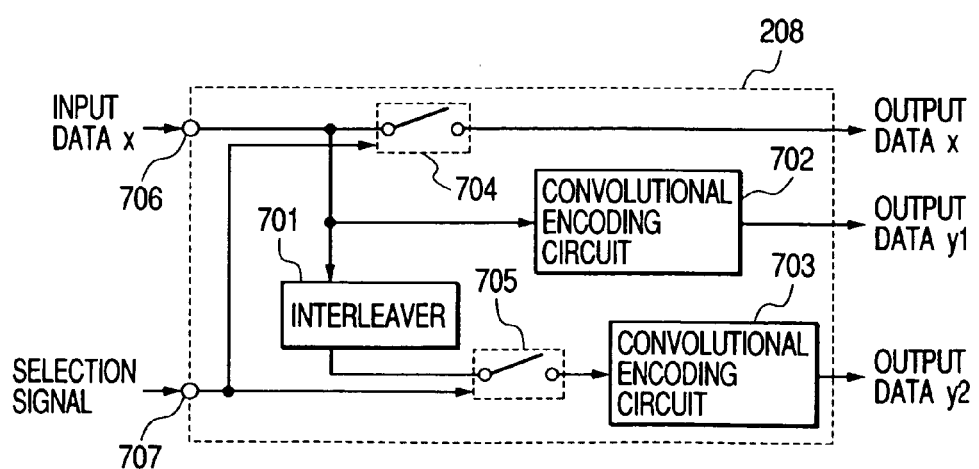
FIG. 7 is a block diagram showing an example of an error correction encoding circuit according to the embodiment.

FIG. 7 is a block diagram showing an example of the error correction encoding circuit 208 of this embodiment.

The error correction decoding circuit 208 is constituted of: an interleaver 701; convolutional encoding circuits 702 and 703: switches 704 and 705 to be controlled by a selection signal; an input terminal 706 to which digital data is input; and an input terminal 707 to which the selection signal for controlling the operation of this circuit 208 is input. The convolutional encoding circuits 702 and 703 realize the above-described recursive convolutional encoding algorithm, and is constituted of, for example, the recursive convolutional encoding circuit 310 shown in FIG. 3B.

If the selection signal is active, the switches 704 and 705 are turned on, and the error correction encoding circuit 208 operates as an error correction encoding circuit for realizing the above-described turbo encoding algorithm. More specifically, the error correction encoding circuit 208 performs similar processes to the error correction encoding circuit 500 shown in FIG. 5. Therefore, the error correction encoding circuit 208 outputs turbo encoded data of the three output data x, y1 and y2.

The output data x is equal to the input data x, the output data y1 is equal to the input data x subjected to convolutional encoding by the convolutional encoding circuit 702, and the output data y2 is equal to the interleaved input data x subjected to the convolutional encoding by the convolutional encoding circuit 703.

If the selection signal is inactive, the switches 704 and 705 are turned off, and the error correction encoding circuit 208 operates as an error correction encoding circuit for realizing the above-described recursive convolutional encoding algorithm. Therefore, the error correction encoding circuit 208 outputs convolutional encoded data of only the output data y1.

In the error correction encoding circuit 208, the switches 704 and 705 are turned on and off. The embodiment is not limited only to this structure. For example, after the switches 704 and 705 are turned off, the power of the convolutional encoding circuit 703 may be turned off or may be reduced considerably. Not only the circuit scale can be reduced but also the power consumption can be lowered. If the error correction encoding circuit 208 is applied to a portable electronic apparatus such as a cellular phone, these advantages become distinctive.

In the error correction encoding circuit 208, the switch 705 is connected at the succeeding stage of the interleaver 701. This switch 705 may be connected at the preceding stage thereof. In this case, the power of the interleaver 701 may be turned off or reduced to further lower the power consumption.

Figure 8:
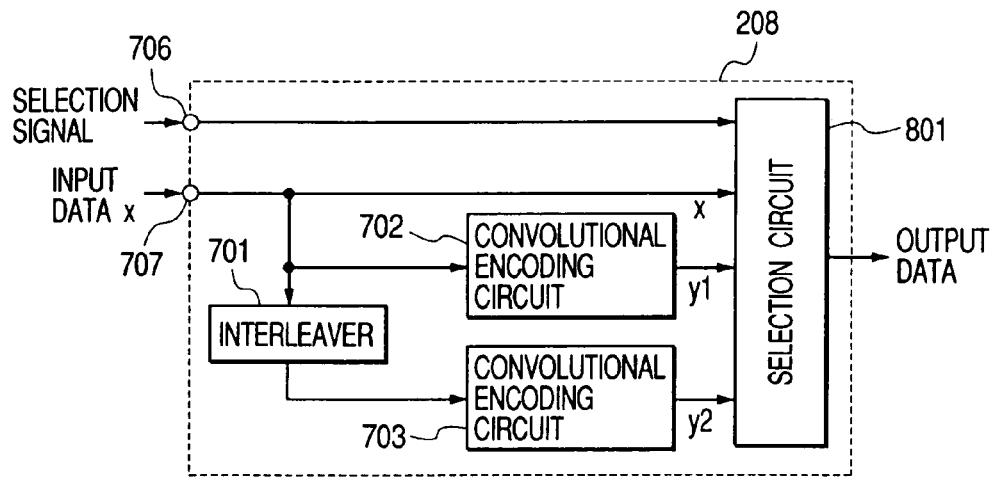
FIG. 8 is a block diagram showing another example of an error correction encoding circuit according to the embodiment.

FIG. 8 is a block diagram showing another example of the error correction encoding circuit 208 of this embodiment. Also the error correction encoding circuit 208 shown in FIG. 8 can realize both the convolutional encoding algorithm and turbo encoding algorithm. In FIG. 8, like elements to those shown in FIG. 7 are represented by using identical reference numerals.

This circuit 208 is constituted of an interleaver 701, convolutional encoding circuits 702 and 703, and a selection circuit 801. In accordance with a selection signal, the selection circuit 801 selects necessary data from the data x, data y1 generated by the convolutional encoding circuit 702, and data y2 generated by the convolutional encoding circuit 703.

If the selection signal is active, the error correction encoding circuit 208 operates as an error correction encoding circuit realizing the above-described turbo encoding algorithm. In this case, the selection circuit 801 selects all of the data x, y1 and y2. Therefore, the error correction encoding circuit 208 outputs turbo encoded data of three data x, y1 and y2.

If the selection signal is inactive, the error correction encoding circuit 208 operates as an error correction encoding circuit realizing the above-described convolutional encoding algorithm. In this case, the selection circuit 801 selects only the data y1. Therefore, the error correction encoding circuit 208 outputs convolutional encoded data of only the data y1.

As described above, according to the embodiment, a portion of the encoding circuit realizing the convolutional encoding algorithm and a portion of the encoding circuit realizing the turbo encoding algorithm are shared so that these algorithms can be realized by one error correction encoding circuit 208. With this structure, a plurality type of error correction encoding algorithms can be realized with a simple and efficient circuit, and the circuit scale and cost can be prevented from being increased.

By adopting the error correction encoding circuit 208 of this embodiment, a portable information processing terminal such as a cell phone and a mobile computer dealing with a plurality of types of error correction encoding algorithms can be made compact and inexpensive.

In this embodiment, if the error correction encoding circuit 208 operates as a convolutional encoding circuit, only the data y1 is output, whereas if it operates as a turbo encoding circuit, the data x, y1 and y2 are output. The embodiment is not limited only thereto, but other combinations may be used.

For example, if the error correction encoding circuit 208 operates as a convolutional encoding circuit, not only data y1 but only data y2 may be output. In this case, the error correction encoding circuit 208 controls the interleaver 701 by a predetermined rule to interleave the input data x, and thereafter the convolutional encoding is executed. With this structure, it is possible to be resistant against burst errors.

With this structure, the error correction encoding circuit 208 can use in common the interleaver 701 and convolutional encoding circuit 703 so that a single error correction encoding circuit can realize both the convolutional error correction encoding algorithm and turbo error correction encoding algorithm.

Next, the structure and operation of the error correction decoding circuit 209 corresponding to the error correction encoding circuit 208 will be described.

Figure 9:
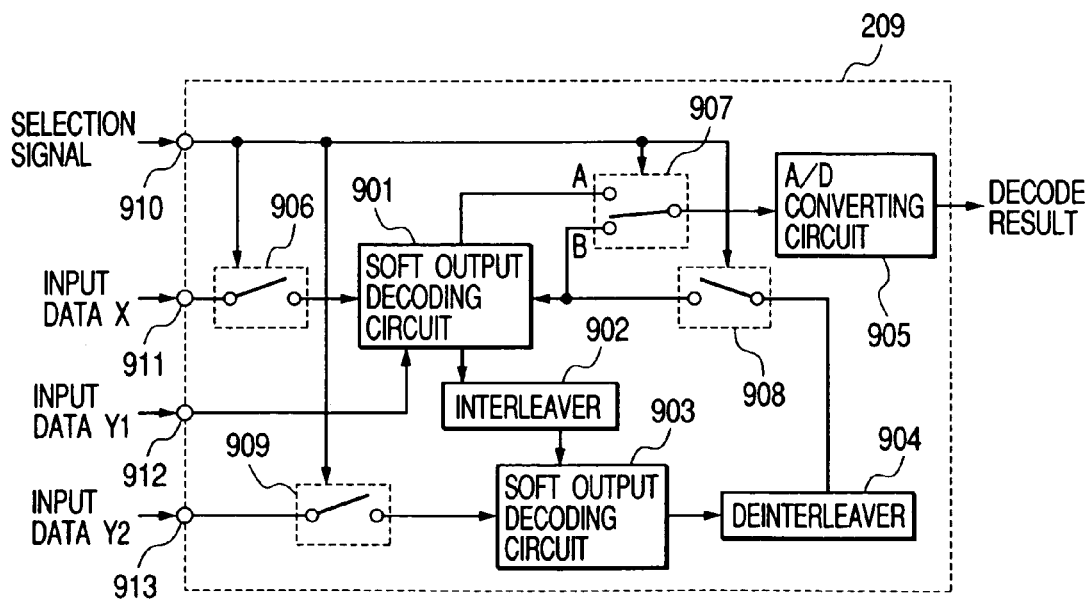
FIG. 9 is a block diagram showing an example of the structure of an error correction decoding circuit according to the embodiment.

FIG. 9 is a block diagram showing an example of the error correction decoding circuit 209 of this embodiment.

This circuit 209 is constituted of: soft output decoding circuits 901 and 903; an interleaver 902 for interleaving an output of the soft output decoding circuit 901 randomly or in accordance with a predetermined rule; a deinterleaver 904 corresponding to the interleaver 902; an analog/digital (A/D) converting circuit 905; switches 906, 908 and 909 which turn on when the selection signal is active; a switch 907 which connects a B side when the selection signal is active and an A side when inactive; an input terminal 910 to which the selection signal for controlling the operation of this circuit 209 is input; an input terminal 911 to which data X is input; an input terminal 912 to which data Y1 is input; and an input terminal 913 to which data Y2 is input.

Similar to the above-described soft output decoding circuits 601 and 603, the soft output decoding circuits 901 and 903 perform a metric calculation of input data, obtain a value (probability degree) representative of a probability that each decoded bit is "1" (or "0"), and output the decoded result containing the probability degree.

The case that the selective signal is active will first be described. In this case, the error correction decoding circuit 209 performs similar processes of, for example, the turbo decoding circuit 600 shown in FIG. 6. The operation of the error correction decoding circuit 209 will be described specifically.

Referring to FIG. 9, turbo encoded data (i.e., input data X, Y1 and Y2) supplied from a transmission path or a storage medium is input to the error correction decoding circuit 209. The input data X, Y1 and Y2 correspond to the output data x, y1 and y1 shown in FIGS. 7 and 8.

The input data X and Y1 are supplied to the soft output decoding circuit 901 and decoded. The interleaver 902 interleaves the decoded result of the soft output decoding circuit 901 and the probability degree of each bit, and supplies the interleaved result to the soft output decoding circuit 903. The soft output decoding circuit 903 performs soft output decoding by using the output of the interleaver 902 and the input data Y2. The decoded result and probability degree are supplied to the deinterleaver 904 to be deinterleaved. An output of the deinterleaver 904 is supplied via the switch 908 to the soft output decoding circuit 901.

The error correction decoding circuit 209 repeats this process a predetermined number of times and thereafter supplies an output of the deinterleaver 904 via the switch 907 to the A/D converting circuit 905 which binarizes the input data and outputs the result as the turbo decoded input data.

Next, the case that the selective signal is inactive will be described. In this case, the error correction decoding circuit 209 performs similar processes of, for example, the soft output decoding circuit 400 shown in FIG. 4.

Referring to FIG. 9, turbo encoded data (i.e., input data Y1) supplied from a transmission path or a storage medium is input to the error correction decoding circuit 209. In this case, the switches 906, 908 and 909 are turned off. The soft output decoding circuit 901 performs soft output decoding of the input data Y1, and supplies the decoded result to the switch 907. Since the switch 907 connects the A side, an output of the soft output decoding circuit 901 is input to the A/D converting circuit 905 which binarizes the input data and outputs the binarized data as the decoded result of the input data Y1.

In the error correction decoding circuit 209, the switches 906, 908 and 909 are turned on and off. The embodiment is not limited only to this structure. For example, after the switches 906, 908 and 909 are turned off, the power to be supplied to the interleaver 902, soft output decoding circuit 903 and deinterleaver 904 may be turned off or may be reduced considerably. Not only the circuit scale can be reduced but also the power consumption can be lowered. If the error correction decoding circuit 209 is applied to a portable electronic apparatus such as a cell phone, these advantages become distinctive.

As described above, according to the embodiment, a portion of the decoding circuit realizing the soft output decoding and a portion of the decoding circuit realizing the turbo decoding algorithm are shared so that these algorithms can be realized by one error correction decoding circuit 209. With this structure, a plurality type of error correction decoding algorithms can be realized with a simple and efficient circuit, and the circuit scale and cost can be prevented from being increased.

By adopting the error correction decoding circuit 209 of this embodiment, a portable information processing terminal such as a cell phone and a mobile computer dealing with a plurality type of error correction decoding algorithms can be made compact and inexpensive.

In this embodiment, if the error correction decoding circuit 209 operates as a soft output decoding circuit, only the data Y1 is decoded, whereas if it operates as a turbo decoding circuit, the data X, Y1 and Y2 are decoded. The embodiment is not limited only thereto, but other combinations may be used.

For example, if the error correction decoding circuit 209 operates as a soft output decoding circuit, not only data Y1 but only data Y2 may be decoded. In this case, the error correction decoding circuit 209 uses the soft output decoding circuit 903 to decode the data Y2, and the decoded result is deinterleaved by the deinterleaver 904 to generate the decoded result from an output of the deinterleaver 904. With this structure, it is possible to decode data subjected to convolutional encoding after interleaving and to be resistant against burst errors.

With this structure, the error correction decoding circuit 209 can use in common the soft output decoding circuit 903 and deinterleaver 904 so that a single error correction decoding circuit can realize both the soft output decoding algorithm and turbo decoding algorithm.

Second Embodiment

In the first embodiment, the error correction encoding circuit 208 shown in FIG. 7 realizes two error correction encoding algorithms (i.e., convolutional encoding algorithm and turbo encoding algorithm).

In the second embodiment, another error correction encoding circuit will be described which can realize not only the convolutional encoding algorithm and turbo encoding algorithm but also a third error correction encoding algorithm having an error correction capability higher than the convolutional encoding algorithm.

An error correction encoding circuit of the second embodiment will be described with reference to the error correction encoding circuit 208 shown in FIG. 7.

First, the case that the error correction encoding circuit 208 realizes the turbo encoding algorithm, will be described. In this case, the circuit 208 turns on both the switches 704 and 705. Therefore, similar to the first embodiment, the error correction encoding circuit 208 outputs turbo encoded data of three output data x, y1 and y2.

Next, the case that the error correction encoding circuit 208 realizes either the convolutional encoding algorithm or the third error correction encoding algorithm, will be described. In this case, in accordance with the selection signal, the circuit 208 either turns off both the switches 704 and 705 or turns off only the switch 705.

If both the switches 704 and 705 are turned off, similar to the first embodiment, the error correction encoding circuit 208 outputs convolutional encoded data of only data x.

In contrast, if only the switch 705 is turned off, the error correction encoding circuit 208 outputs convolutional encoded data of two data x and y1. Therefore, encoded data having a higher error correction capability can be output, although the code length becomes long.

The switches 704 and 705 are controlled by the selection signal. The selection signal adaptively controls turn-on/off of the switches 704 and 705 in accordance with the condition of a transmission path, error characteristics and quality of data to be transmitted, and the like.

As described above, according to the second embodiment, one error correction encoding circuit 208 can realize not only the convolutional encoding algorithm and turbo encoding algorithm but also the third error correction encoding algorithm. With this structure, a plurality type of error correction encoding algorithms can be realized with a simple and efficient circuit, and the circuit scale and cost can be prevented from being increased.

By adopting the error correction encoding circuit 208 of the second embodiment, a portable information processing terminal such as a cell phone and a mobile computer dealing with a plurality type of error correction encoding algorithms can be made compact and inexpensive.

In this embodiment, similar to the first embodiment, a plurality type of error correction encoding algorithms can be realized by sharing the interleaver 701 and convolutional encoding circuit 703. In this case, the error correction encoding circuit 208 can output one of the encoded data of only data y2, encoded data of data x and y2, and encoded data of data x, y1 and y2.

In the first embodiment, the error correction decoding circuit 209 shown in FIG. 9 realizes two error correction decoding algorithms (i.e., soft output decoding algorithm and turbo decoding algorithm).

In the second embodiment, another error correction decoding circuit will be described which can realize not only the soft output decoding algorithm and turbo decoding algorithm but also a third error correction decoding algorithm.

An error correction decoding circuit of the second embodiment will be described with reference to the error correction decoding circuit 209 shown in FIG. 9. This circuit corresponds to the error correction encoding circuit of the second embodiment.

First, the case that the error correction decoding circuit 209 realizes the turbo decoding algorithm, will be described. In this case, the circuit 209 turns on both the switches 906 and 908. Therefore, similar to the second embodiment, the error correction decoding circuit 209 decodes three input data X, Y1 and Y2.

Next, the case that the error correction decoding circuit 209 realizes either the soft output decoding algorithm or the third error correction decoding algorithm, will be described. In this case, in accordance with the selection signal, the circuit 209 either turns off both the switches 906 and 908 or turns off only the switch 908.

If both the switches 906 and 908 are turned off, similar to the second embodiment, the error correction decoding circuit 209 decodes only the input data X.

In contrast, if only the switch 908 is turned off, the error correction decoding circuit 209 decodes two input data X and Y1. Therefore, the error correction decoding circuit 209 can decode encoded data by the third error correction decoding algorithm having a higher error correction capability.

The switches 906 and 908 are controlled by the selection signal. The selection signal adaptively controls turn-on/off of the switches 906 and 908 in accordance with the condition of a transmission path, error correction encoding algorithm used for received data, and the like.

As described above, according to the second embodiment, one error correction decoding circuit 209 can realize not only soft output decoding algorithm and turbo decoding algorithm but also the third error correction decoding algorithm. With this structure, a plurality type of error correction decoding algorithms can be realized with a simple and efficient circuit, and the circuit scale and cost can be prevented from being increased.

By adopting the error correction decoding circuit 209 of the second embodiment, a portable information processing terminal such as a cell phone and a mobile computer dealing with a plurality type of error correction decoding algorithms can be made compact and inexpensive.

Third Embodiment

Figure 10:
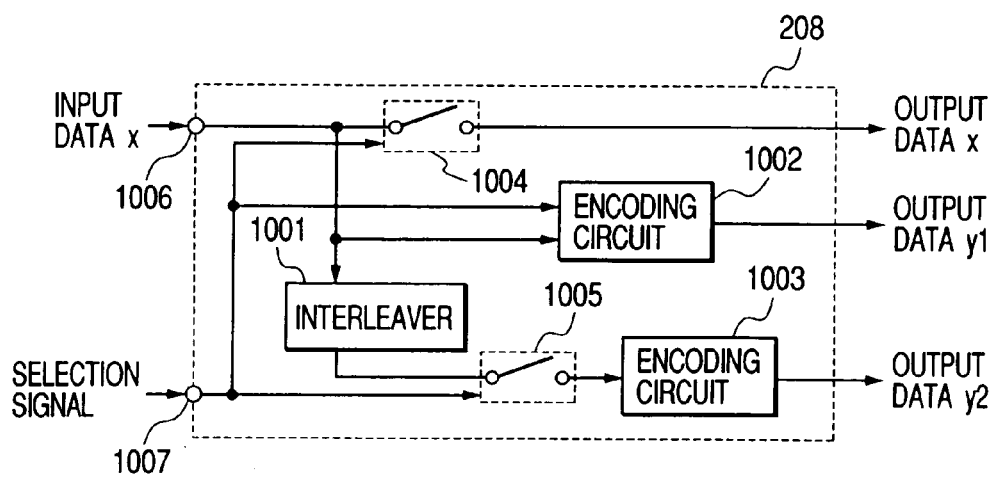
FIG. 10 is a block diagram showing another example of an error correction encoding circuit according to an embodiment of the invention.

FIG. 10 is a block diagram showing another example of an error correction encoding circuit according to the third embodiment.

The error correction encoding circuit 208 is constituted of: an interleaver 1001; encoding circuits 1002 and 1003 whose operation is controlled by a selection signal; switches 1004 and 1005 whose turn-on/off is controlled by the selection signal; an input terminal 1006 to which digital data is input; and an input terminal 1007 to which the selection signal for controlling the operation of this circuit 208 is input.

The switches 1004 and 1005 are turned on if the selection signal is active. The encoding circuit 1003 operates as an encoding circuit realizing the above-described recursive convolutional encoding algorithm.

Figure 11:
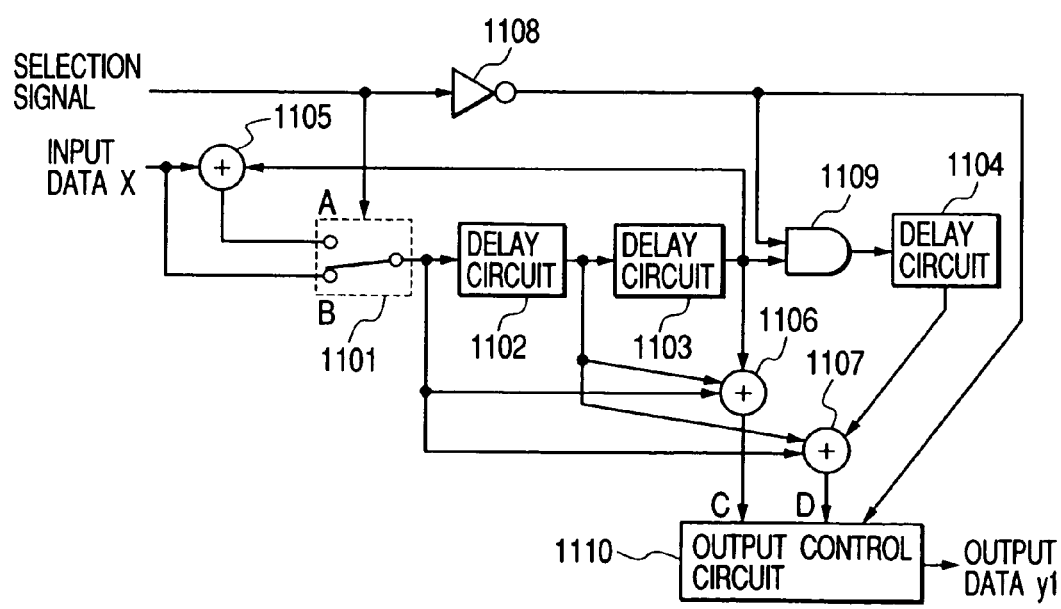
FIG. 11 is a block diagram showing an example of an encoding circuit 802 shown in FIG. 8.

FIG. 11 is a block diagram showing an example of the structure of the encoding circuit 1002.

Referring to FIG. 11, the encoding circuit 1002 is controlled by the selection signal to be externally input. More specifically, the number of effective delay circuits, the electrical connections of delay circuits and adders, a presence/absence of a recursive process, and the like are determined to selectively execute a plurality of error correction encoding algorithms having different error correction capabilities.

The encoding circuit 1002 is constituted of: a switch 1101 for selecting one of two inputs A and B; delay circuits 1102, 1103 and 1104; mod 2 adders 1105, 1106 and 1107; a NOT gate 1108; an AND gate 1109, and an output control circuit 1110 for outputting one of two inputs C and D.

First, the case that the selection signal is active will be described. In this case, the switch 1101 is connected to an A side contact shown in FIG. 11, and the encoding circuit 1002 operates as a circuit realizing the above-described recursive convolutional encoding algorithm. More specifically, the encoding circuit 1002 operates as a recursive convolutional encoding circuit having a constraint length of 3 and an encoding rate of 1/1.

In this case, since the selection signal inverted by the NOT gate 1108 is input to the AND gate 1109, an output of the AND gate 1109 is always "0". The output control circuit 1110 selects only the output C of the adder 1106 and outputs it as output data y1.

The input data x and an output of the delay circuit 1103 are input to the adder 1105, and the calculation result is input to the switch 1101. Outputs of the adder 1105 and delay circuits 1102 and 1103 are input to the adder 1106, and the calculation result (i.e., output signal C) is supplied to the output control circuit 1110.

As above, while the selection signal is active, the encoding circuit 1002 operates as a recursive convolutional encoding circuit. In this case, the structure of the encoding circuit 1002 is same as that of the encoding circuit 1003. Therefore, the error correction encoding circuit 208 has the same structure as that of the turbo encoding circuit 500 shown in FIG. 5 and operates as a circuit realizing the above-described turbo encoding algorithm.

Next, the case that the selection signal is inactive will be described. In this case, the switch 1101 is connected to a B side contact shown in FIG. 11, and the encoding circuit 1002 operates as a circuit realizing the above-described non-recursive convolutional encoding algorithm. More specifically, the encoding circuit 1002 operates as a non-recursive convolutional encoding circuit having a constraint length of 4 and an encoding rate of 1/2.

In this case, the AND gate 1109 supplies an output itself of the delay circuit 1103 to the delay circuit 1104. The output control circuit 1110 selects an output C of the adder 1106 and an output D of the adder 1107 and outputs output data y1 of the output signals C and D.

The input data x and outputs of the delay circuits 1102 and 1103 are input to the adder 1106, and the calculation result (i.e., output signal C) is supplied to the output control circuit 1110. Input data series x and outputs of the delay circuits 1102 and 1104 are input to the adder 1107, and the calculation result (i.e., output signal D) is supplied to the output control circuit 1110.

As above, while the selection signal is inactive, the encoding circuit 1002 operates as a non-recursive convolutional encoding circuit. Therefore, the error correction encoding circuit 208 operates as a circuit realizing the above-described non-recursive convolutional encoding algorithm.

As described above, according to the third embodiment, the number of delay circuits and the constraint length are set greater when the encoding circuit 1002 operates as a non-recursive convolutional encoding circuit than when it operates as a recursive convolutional encoding circuit. With this structure, the error correction capability and calculation amount of the error correction encoding circuit 208 can be optimized for each error correction encoding algorithm.

By adopting the error correction encoding circuit 208 of the third embodiment, a portable information processing terminal such as a cell phone and a mobile computer dealing with a plurality type of error correction encoding algorithms can be made compact and inexpensive.

The encoding circuit 1002 shown in FIG. 11 is only illustrative, and the embodiment is not limited only thereto. For example, the number of delay circuits to be changed by the selection signal may be increased. If a second selection signal is used, it is possible to selectively change the number of delay circuits in accordance with a transmission path condition, a system load and the like, even if the selection signal is inactive.

As described above, according to the third embodiment, one error correction encoding circuit can realize both the turbo encoding algorithm and non-recursive convolutional encoding algorithm.

When the turbo encoding algorithm and non-recursive convolutional encoding algorithm are exchanged, the error correction capability and the number of delay circuits influencing the calculation amount may be changed. With this structure, the error correction capability and calculation amount can be optimized for each error correction encoding algorithm.

Fourth Embodiment

In the third embodiment, the error correction encoding circuit 208 realizes a plurality type of error correction encoding algorithms by sharing one of the two encoding circuits 1002 and 1003.

In contrast, in the fourth embodiment, a plurality type of error correction encoding algorithms are realized by sharing an encoding circuit integrating the encoding circuits 1002 and 1003. This embodiment will be described.

Figure 12:
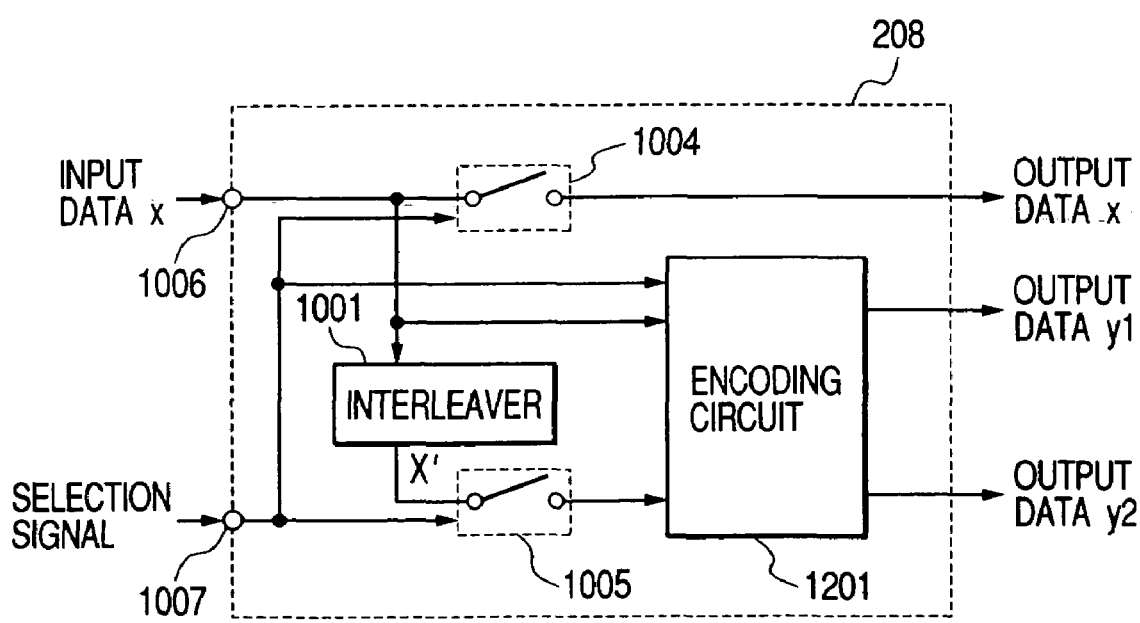
FIG. 12 is a block diagram showing another example of an error correction encoding circuit according to an embodiment of the invention.

FIG. 12 is a block diagram showing an example of an error correction encoding circuit according to the fourth embodiment. In FIG. 12, like elements to those shown in FIG. 10 are represented by using identical reference numerals.

The error correction encoding circuit 208 is constituted of: an interleaver 1001; an encoding circuit 1201 whose operation is controlled by a selection signal; switches 1004 and 1005 whose turn-on/off is controlled by the selection signal; an input terminal 1006 to which digital data is input; and an input terminal 1007 to which the selection signal for controlling the operation of this circuit 208 is input. The switches 1004 and 1005 are turned on if the selection signal is active.

Figure 13:
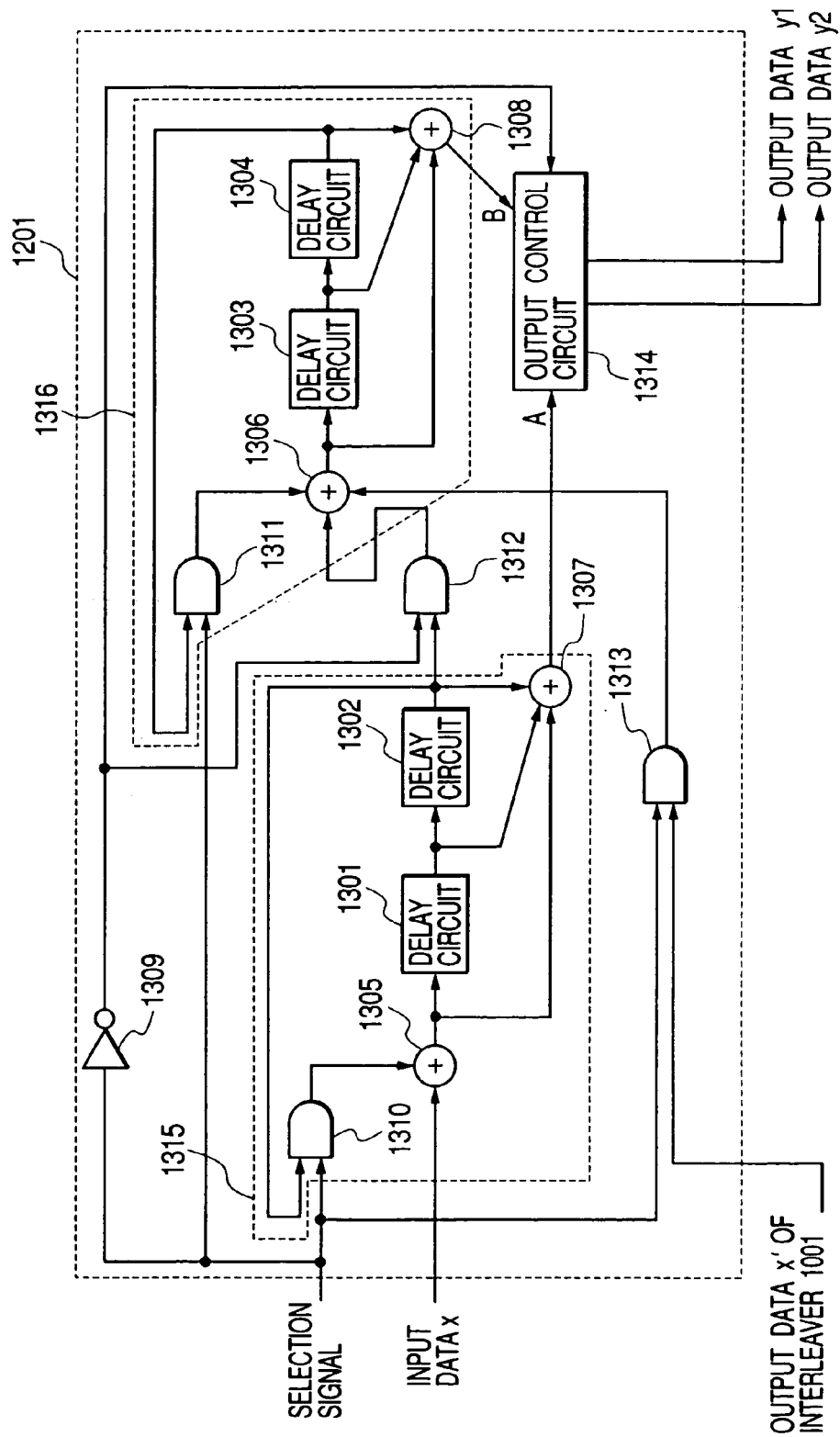
FIG. 13 is a block diagram showing an example of an encoding circuit 1001 shown in FIG. 10.

FIG. 13 is a block diagram showing an example of the structure of the encoding circuit 1201.

Referring to FIG. 13, the encoding circuit 1201 is controlled by the selection signal to be externally input. More specifically, the number of effective delay circuits, the electrical connections of delay circuits and adders, a presence/absence of a recursive process, and the like are determined to selectively execute a plurality of error correction encoding algorithms having different error correction capabilities.

The encoding circuit 1201 is constituted of: delay circuits 1301, 1302, 1303 and 1304, mod 2 adders 1305, 1306, 1307 and 1308; a NOT gate 1309; AND gates 1310, 1311, 1312 and 1313; and an output control circuit 1314.

First, the case that the selection signal is active will be described. In this case, the encoding circuit 1201 operates as two encoding circuits realizing the above-described recursive convolutional encoding algorithm. More specifically, the circuit portion 1315 shown in FIG. 13 operates as the first recursive convolutional encoding circuit, and the circuit portion 1316 operates as the second recursive convolutional encoding circuit.

In this case, the AND gates 1310 and 1311 output the outputs themselves of the delay circuits 1302 and 1304. The AND gate 1312 is always "0", and the AND gate 1313 outputs the data x' itself supplied from the interleaver 1001. Therefore, the circuit portion 1315 encodes the data x by a recursive convolutional encoding algorithm, whereas the circuit portion 1316 encodes the data x' by a recursive convolutional encoding algorithm.

The output control circuit 1314 outputs an output A of the adder 1307 as output data y1 and outputs an output B of the adder 1308 as output data y2.

As above, while the selection signal is active, the encoding circuit 1201 operates as two recursive convolutional encoding circuits, so that the error correction encoding circuit 208 operates as the turbo encoding circuit shown in FIG. 5. The first and second recursive convolutional encoding circuits formed in the encoding circuit 1201 have the same number of delay circuits, and the same constraint length and encoding rate.

Next, the case that the selection signal is inactive will be described. In this case, the encoding circuit 1201 operates as one encoding circuit realizing the above-described non-recursive convolutional encoding algorithm.

In this case, the AND gates 1310, 1311 and 1313 output always "0". The AND gate 1312 outputs an output itself of the delay circuit 1302 and the AND gate 1313 outputs always "0". Therefore, an output of the delay circuit 1302 is directly input to the delay circuit 1303.

The input data x and outputs of the delay circuits 1301 and 1302 are input to the adder 1307, and the calculation result (i.e., output signal A) is supplied to the output control circuit 1314. Outputs of the delay circuits 1302, 1303 and 1304 are input to the adder 1308, and the calculation result (i.e., output signal B) is supplied to the output control circuit 1314.

The output control circuit 1314 outputs a sum of the outputs A and B of the adders 1107 and 1308 as output data y1. Namely, the output control circuit 1314 outputs a sum of the input data x and outputs of the delay circuits 1301, 1303 and 1304.

As above, while the selection signal is inactive, the encoding circuit 1201 operates as one non-recursive convolutional encoding circuit. The number of delay circuits and constraint length of one non-recursive convolutional encoding circuit formed in the encoding circuit 1201 become greater than those of the above-described first and second recursive convolutional encoding circuits.

As described above, according to the fourth embodiment, the number of delay circuits and the constraint length are set greater when the encoding circuit 1201 operates as one non-recursive convolutional encoding circuit than when it operates as two recursive convolutional encoding circuits. With this structure, the error correction capability and calculation amount of the error correction encoding circuit 208 can be optimized for each error correction encoding circuit.

The encoding circuit 1201 shown in FIG. 13 is only illustrative, and the embodiment is not limited only thereto. For example, the number of delay circuits to be changed by the selection signal may be increased. If a second selection signal is used, it is possible to selectively change the number of delay circuits in accordance with a transmission path condition, a system load and the like, even if the selection signal is inactive.

As described above, according to the fourth embodiment, one encoding circuit can realize the turbo encoding algorithm which requires two encoding circuits, and the non-recursive convolutional encoding algorithm can be realized by using one encoding circuit.

By adopting the error correction encoding circuit 208 of the fourth embodiment, a portable information processing terminal such as a cell phone and a mobile computer dealing with a plurality type of error correction encoding algorithms can be made compact and inexpensive.

When the turbo encoding algorithm and non-recursive convolutional encoding algorithm are exchanged, the error correction capability and the number of delay circuits influencing the calculation amount may be changed. With this structure, the error correction capability and calculation amount can be optimized for each error correction encoding algorithm.

Fifth Embodiment

Figure 14:
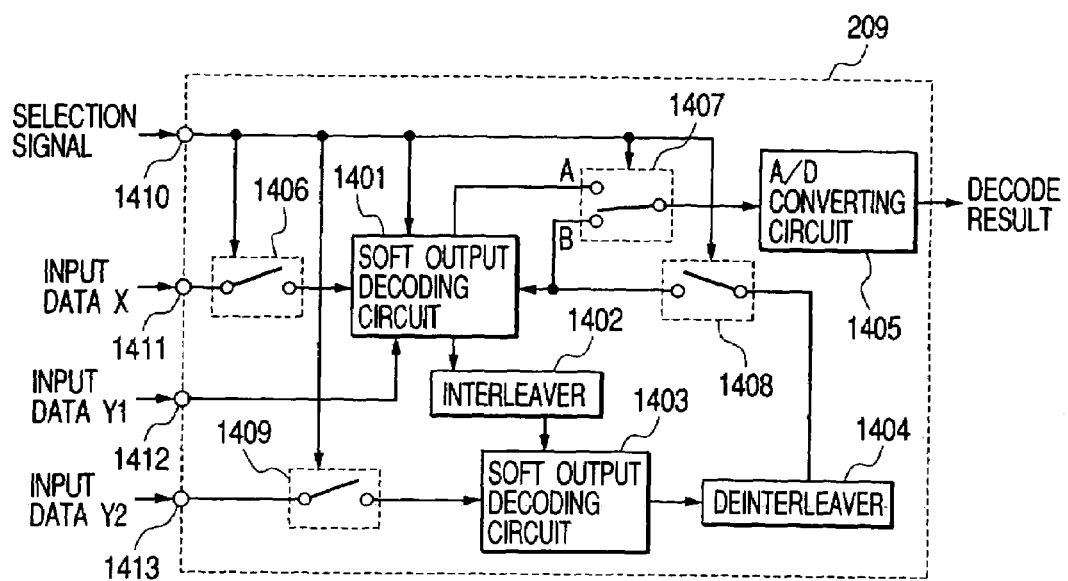
FIG. 14 is a block diagram showing another example of an error correction decoding circuit according to an embodiment of the invention.

FIG. 14 is a block diagram showing an example of the error correction decoding circuit 209 of this embodiment.

This circuit 209 is constituted of: a soft output decoding circuit 1401 whose operation is controlled by a selection signal; an interleaver 1402; a soft output decoding circuit 1403; a deinterleaver 1404 corresponding to the interleaver 1402; an analog/digital (A/D) converting circuit 1405; switches 1406, 1408 and 1409 whose on-off is controlled by the selection signal; a switch 1407 which connects a B side contact when the selection signal is active and connects an A side contact when inactive; an input terminal 1410 to which the selection signal for controlling the operation of this circuit 209 is input; an input terminal 1411 to which data X is input; an input terminal 1412 to which data Y1 is input; and an input terminal 1413 to which data Y2 is input.

The input data X, Y1 and Y2 correspond to the output data x, y1 and y2 shown in FIG. 10 or 12.

The case that the selective signal is active will first be described. In this case, the switches 1406, 1408 and 1409 turn on, and the switch 1407 is connected to the B side contact. Therefore, the error correction decoding circuit 209 operates as a decoding circuit for decoding the input data X, Y1 and Y2 by using the two soft output decoding circuits 1401 and 1403. In this case, the error correction decoding circuit 209 operates as a circuit for realizing the above-described turbo decoding algorithm.

While the selection signal is active, the two soft output decoding circuits 1401 and 1403 realize similar soft output decoding algorithms. Next, the case that the selective signal is inactive will be described. In this case, the switches 1406, 1408 and 1409 are turned off, and the switch 1407 is connected to the A side contact. Therefore, the error correction decoding circuit 209 operates as a decoding circuit for decoding the input data Y1 by using only the soft output decoding circuits 1401. In this case, the error correction decoding circuit 209 operates as a circuit for realizing the above-described soft output decoding algorithm.

Figure 15:
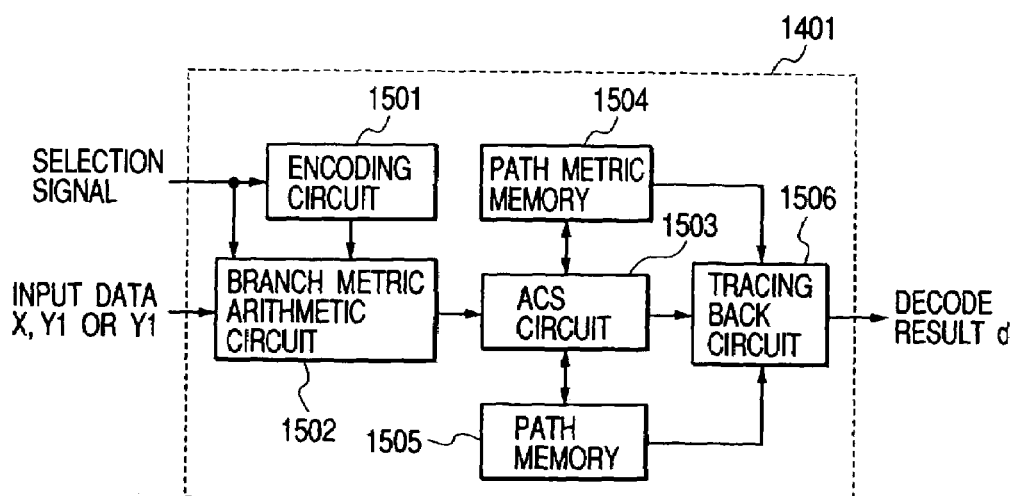
FIG. 15 is a block diagram showing an example of a soft output decoding circuit 1201 shown in FIG. 12.

FIG. 15 is a block diagram showing an example of the structure of the soft output decoding circuit 1401.

The soft output decoding circuit 1401 is constituted of: an encoding circuit 1501 whose internal connections are changed in accordance with a selection signal; a branch metric arithmetic circuit 1502 for calculating a branch metric for input data X and Y1 or a branch metric for input data Y1 in accordance with the selection signal; an ACS circuit 1503; a path metric memory 1504 for storing path metric values of all paths; a path memory 1505 for storing pass selection data representative of a survival path selected by the ACS circuit 1503; and a tracing back circuit 1506 for comparing the maximum probability path with a competitive path competitive with the maximum probability path and generating probability data of the maximum probability path.

The encoding circuit 1501 has the structure corresponding to the error correction encoding circuit 208, and when the circuit 208 operates as a non-recursive convolutional encoding circuit, generates a plurality of states the circuit 208 can take. When the circuit 208 operates as the turbo encoding circuit, the encoding circuit 1501 generates a plurality of states the first convolutional encoding circuit of the circuit 208 can take. More specifically, in accordance with the selection signal, the encoding circuit 1501 changes the number of effective delay circuits, the connections of delay circuits and adders, a presence/absence of a recursive process and the like to switch between decodable error correction encoding algorithms.

While the selection signal is active, the encoding circuit 1501 takes the circuit structure capable of generating code bits necessary for obtaining the branch metric values of the input data X and Y1, and the branch metric arithmetic circuit 1502 takes the circuit structure capable of comparing an output of the encoding circuit 1501 with the input data X and Y1 and obtaining a branch metric of each branch. The input data X and Y1 are a portion of encoded data generated when the error correction encoding circuit 208 realizes the turbo encoding algorithm.

While the selection signal is inactive, the encoding circuit 1501 takes the circuit structure capable of generating code bits necessary for obtaining the branch metric value of the input data Y1, and the branch metric arithmetic circuit 1502 takes the circuit structure capable of comparing an output of the encoding circuit 1501 with the input data Y1 and obtaining a branch metric of each branch. The input data Y1 is a portion of encoded data generated when the error correction encoding circuit 208 realizes the non-recursive convolutional encoding algorithm.

As described above, according to the fifth embodiment, by using one soft output decoding circuit necessary for realizing the turbo decoding algorithm, data encoded by the non-recursive decoding algorithm can be soft-output decoded.

By adopting the error correction decoding circuit 209 of the fifth embodiment, a portable information processing terminal such as a cell phone and a mobile computer dealing with a plurality type of error correction decoding algorithms can be made compact and inexpensive.

The soft output decoding circuit 1401 shown in FIG. 14 is only illustrative and the embodiment is not limited only thereto. For example, the encoding circuit 1501 may be realized by a table storing correspondence data of input/output of the encoding circuit 1501. In this case, the soft output decoding circuit 1401 takes the circuit structure that by selecting a predetermined table from a plurality type of tables, the decodable error correction encoding algorithms are switched. With this structure, the soft output decoding circuit 1401 can be further simplified.

Sixth Embodiment

Figure 16:
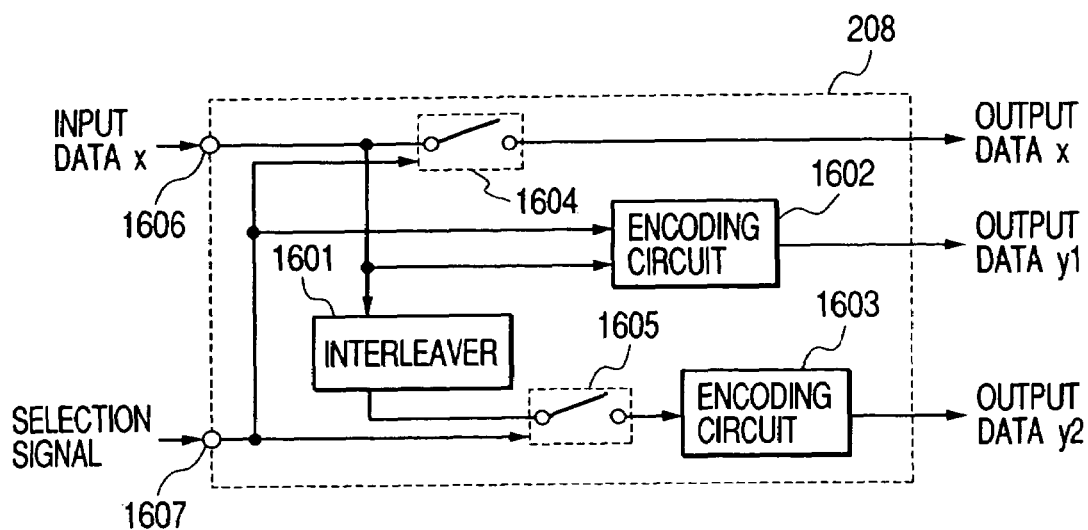
FIG. 16 is a block diagram showing another example of an error correction encoding circuit according to an embodiment of the invention.

FIG. 16 is a block diagram showing another example of an error correction encoding circuit 208 according to the sixth embodiment.

The error correction encoding circuit 208 is constituted of: an interleaver 1601; encoding circuits 1602 and 1603; switches 1604 and 1605 whose turn-on/off is controlled by a selection signal; an input terminal 1606 to which digital data is input; and an input terminal 1607 to which the selection signal for controlling the operation of this circuit 208 is input.

The switches 1604 and 1605 are turned on if the selection signal is active, and the internal connections of the encoding circuit 1602 are changed. Therefore, the error correction encoding circuit 208 operates as an encoding circuit realizing the turbo encoding algorithm shown in FIG. 5. The error correction encoding circuit 208 therefore outputs turbo encoded data of three output data x, y1 and y2. The internal structure of the encoding circuit 1602 will be later described.

The output data x is equal to the input data x, the output data y1 is equal to the input data x subjected to convolutional encoding by the encoding circuit 1602, and the output data y2 is equal to the interleaved input data x subjected to the convolutional encoding by the encoding circuit 1603.

If the selection signal is inactive, the switches 1604 and 1605 are turned off, and the internal connections of the encoding circuit 1602 are changed. Therefore, the error correction encoding circuit 208 operates as an error correction encoding circuit for realizing the non-recursive convolutional encoding algorithm shown in FIG. 3A. The error correction encoding circuit 208 therefore outputs convolutional encoded data of only the output data y1.

Figure 17:
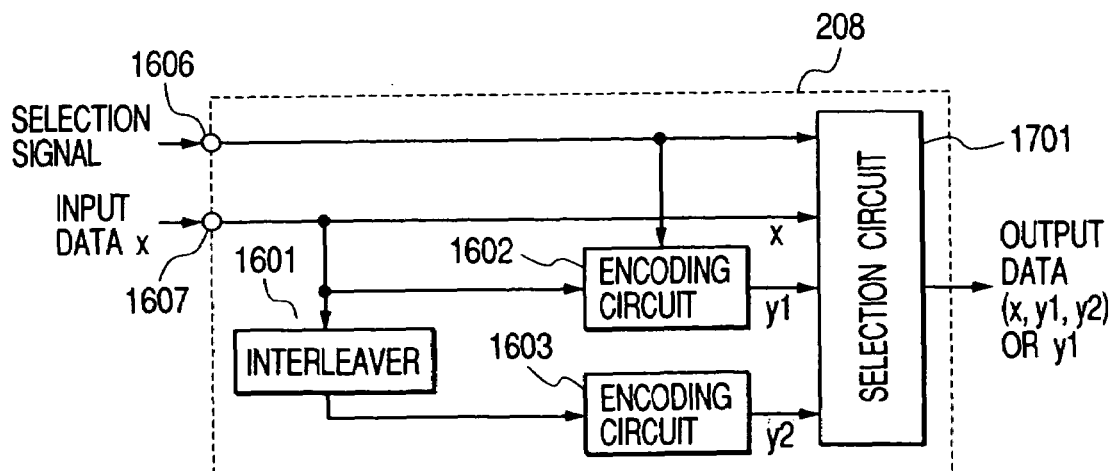
FIG. 17 is a block diagram showing another example of an error correction encoding circuit of the embodiment.

FIG. 17 is a block diagram showing another example of the error correction encoding circuit 208 of this embodiment. Also the error correction encoding circuit 208 shown in FIG. 17 can realize both the convolutional encoding algorithm and turbo encoding algorithm. In FIG. 17, like elements to those shown in FIG. 16 are represented by using identical reference numerals.

This circuit 208 is constituted of an interleaver 1601, encoding circuits 1602 and 1603, and a selection circuit 1701. In accordance with a selection signal, the selection circuit 1701 selects necessary data from the data x, data y1 generated by the encoding circuit 1602, and data y2 generated by the encoding circuit 1603.

If the selection signal is active, the internal connections of the encoding circuit 1602 are changed, and the error correction encoding circuit 208 operates as an error correction encoding circuit realizing the above-described turbo encoding algorithm. In this case, the selection circuit 1701 selects all of the data x, y1 and y2. Therefore, the error correction encoding circuit 208 outputs turbo encoded data of three data x, y1 and y2.

If the selection signal is inactive, the internal connections of the encoding circuit 1602 are changed and the error correction encoding circuit 208 operates as an error correction encoding circuit realizing the above-described convolutional encoding algorithm. In this case, the selection circuit selects only the data y1. Therefore, the error correction encoding circuit 208 outputs convolutional encoded data of only the data y1.

Figure 18:
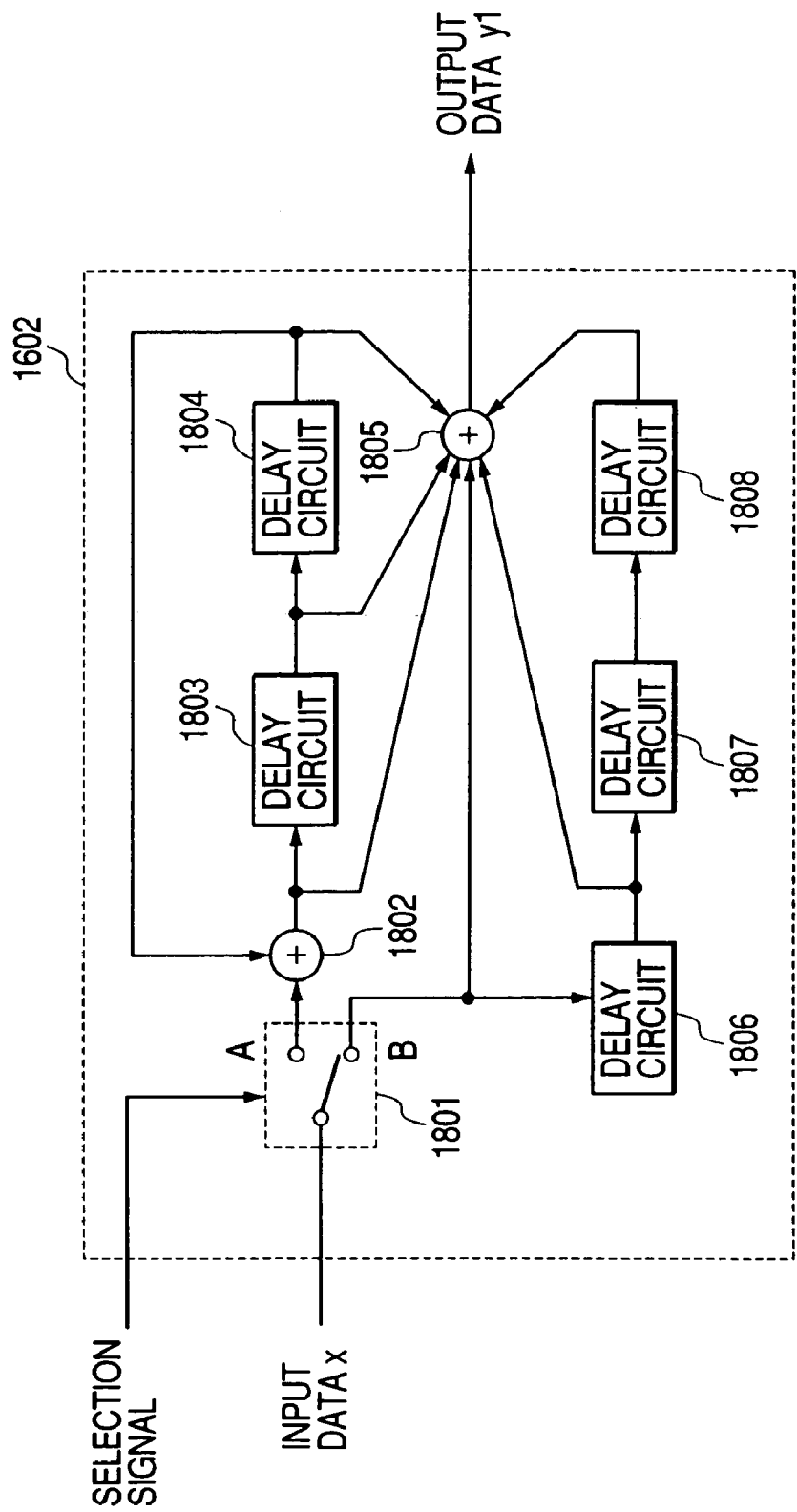
FIG. 18 is a block diagram showing an example of an encoding circuit having an error correction encoding circuit of the embodiment.

Next, an example of the internal structure of the encoding circuit 1602 will be described with reference to FIG. 18.

The encoding circuit 1602 is constituted of: a first block having a switch 1801 whose on/off is controlled by a selection signal, two adders 1802 and 1805 and two delay circuits 1803 and 1804; and a second block having the adder 1805 and three delay circuits 1806, 1807 and 1808.

While the selection signal is active, the switch 1801 connects an A side contact and an input series x is input to the adder 1802. The adder 1802 is input with the input series x and an output of the delay circuit 1804, and the calculation result is supplied to the delay circuit 1803 and adder 1805. The delay circuit 1803 delays input data by a predetermined unit time and supplies it to the delay circuit 1804 and adder 1805. Similarly, the delay circuit 1804 delays input data by a predetermined unit time and supplies it to the delay circuits 1802 and 1805. The adder 1805 adds the outputs of the adder 1802 and delay circuits 1803 and 1804 and outputs the addition result as the output data y1.

As above, while the selection signal is active, the encoding circuit 1602 operates as a circuit realizing the recursive convolutional encoding algorithm as shown in FIG. 3B. In this case, the encoding circuit 1602 takes a circuit structure similar to the encoding circuit 1603. The encoding circuit 1602 has a constraint length of 3 and an encoding rate of 1/1. The values of the constraint length and encoding rate are not limited only thereto, but other values may also be used.

While the selection signal is inactive, the switch 1801 connects a B side contact and an input series x is input to the delay circuit 1806 and adder 1805. The delay circuit 1806 delays input data by a predetermined unit time and supplies it to the delay circuit 1807 and adder 1805. The delay circuit 1807 delays input data by a predetermined unit time and supplies it to the delay circuit 1808. The delay circuit 1808 delays input data by a predetermined unit time and supplies it to the adder 1805. The adder 1805 adds the input series and the outputs of the delay circuits 1806 and 1808 and outputs the addition result as the output data y1.

As above, while the selection signal is inactive, the encoding circuit 1602 operates as a circuit realizing the non-recursive convolutional encoding algorithm as shown in FIG. 3A. In this case, the encoding circuit 1602 has a constraint length of 4 and an encoding rate of 1/2. The values of the constraint length and encoding rate are not limited only thereto, but other values may also be used.

Since the encoding circuit 1602 has the above-described structure, similar to the above embodiments, the error correction encoding circuit 208 of the sixth embodiment can realize a plurality of error correction encoding algorithms having different error correction capabilities, which algorithms are switched in accordance with the selection signal.

Next, the operation of the error correction encoding circuit 208 will be described with reference to FIGS. 19A to 19C.

Figure 19:
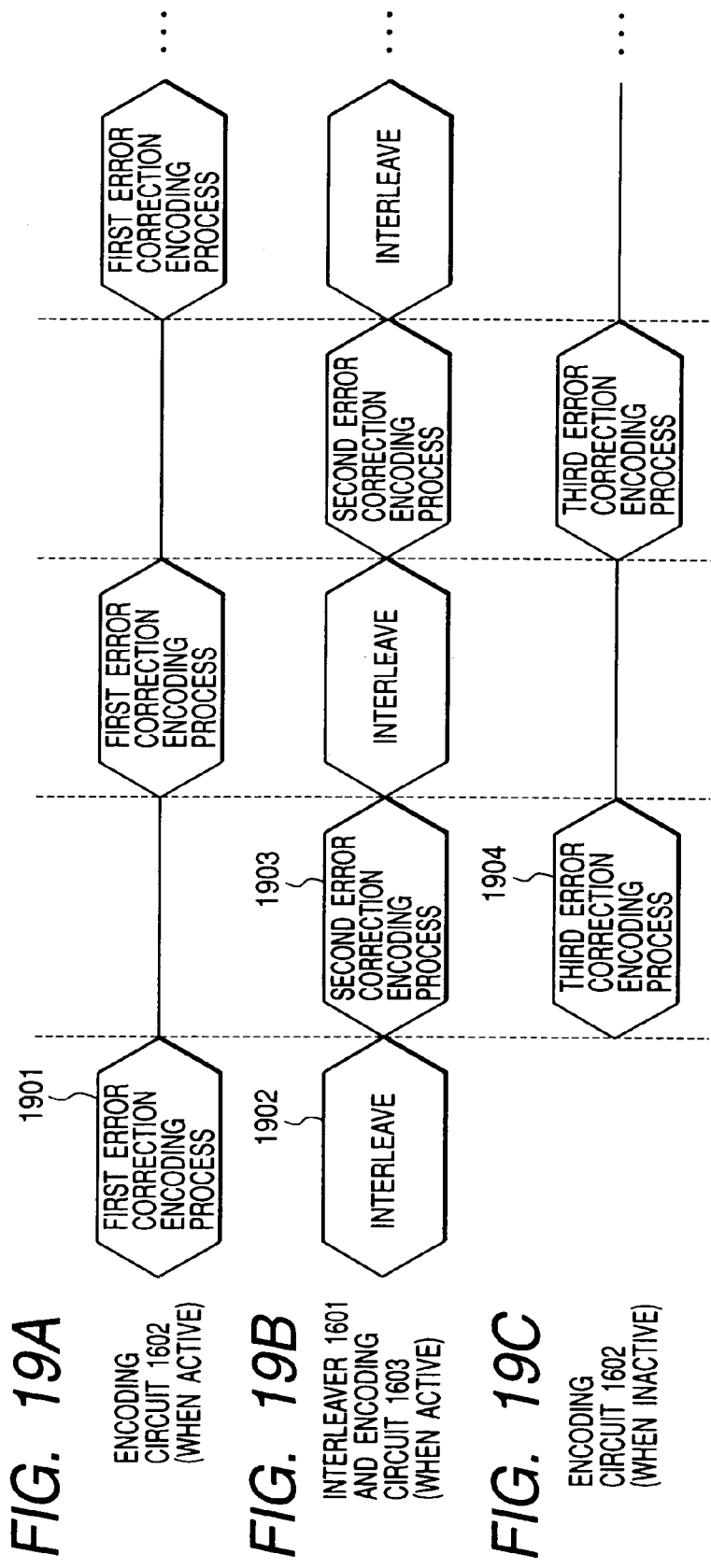
FIGS. 19A, 19B and 19C are diagrams illustrating the operations to be executed by an error correction encoding circuit of the embodiment.

FIG. 19A illustrates the operation of the encoding circuit 1602 while the selection signal is active, and FIG. 19B illustrates the operation of the interleaver 1601 and encoding circuit 1603. FIG. 19C illustrates the operation of the encoding circuit 1602 while the selection signal is inactive.

While the selection signal is active, the switch 1801 of the encoding circuit 1602 connects the A side contact, and the encoding circuit 1602 encodes the input data x by the recursive convolutional encoding algorithm (a first error correction encoding process 1901 shown in FIG. 19A). The interleaver 1601 interleaves the input data x in accordance with a predetermined rule, and supplies the interleaved result to the encoding circuit 1603 (1902 in FIG. 19B). Thereafter, the encoding circuit 1603 encodes an output of the interleaver 1601 by the recursive convolutional encoding algorithm (a second error correction encoding process 1903 shown in FIG. 19B).

After the first error correction encoding process is completed, the selection signal becomes inactive and the switch 1801 of the encoding circuit 1602 connects the B side contact to change the internal connections of the encoding circuit 1602. While the encoding circuit 1603 executes the second error correction encoding process, the encoding circuit 1602 encodes the input data x by the non-recursive convolutional encoding algorithm (a third error correction encoding process 1904 shown in FIG. 19C).

After the third error correction encoding process is completed, the selection signal becomes active and the switch 1801 connects the A side contact, and the encoding circuit 1602 executes again the first error correction encoding process.

As described above, the error correction encoding circuit 208 of the sixth embodiment can operate as an error correction encoding circuit realizing the above-described turbo encoding algorithm while the selection signal is active, and can operate as an error correction encoding circuit realizing the above-described non-recursive convolutional encoding algorithm while the selection signal is inactive. Two encoding algorithms having different error correction capabilities can be processed in parallel (in other words, time divisionally at the same time) and various functional channels can be error-correction encoded efficiently and at high speed.

By adopting the error correction encoding circuit 208 of the sixth embodiment, a portable information processing terminal such as a cell phone and a mobile computer dealing with a plurality type of error correction decoding algorithms can be made compact and inexpensive.

Figure 20:
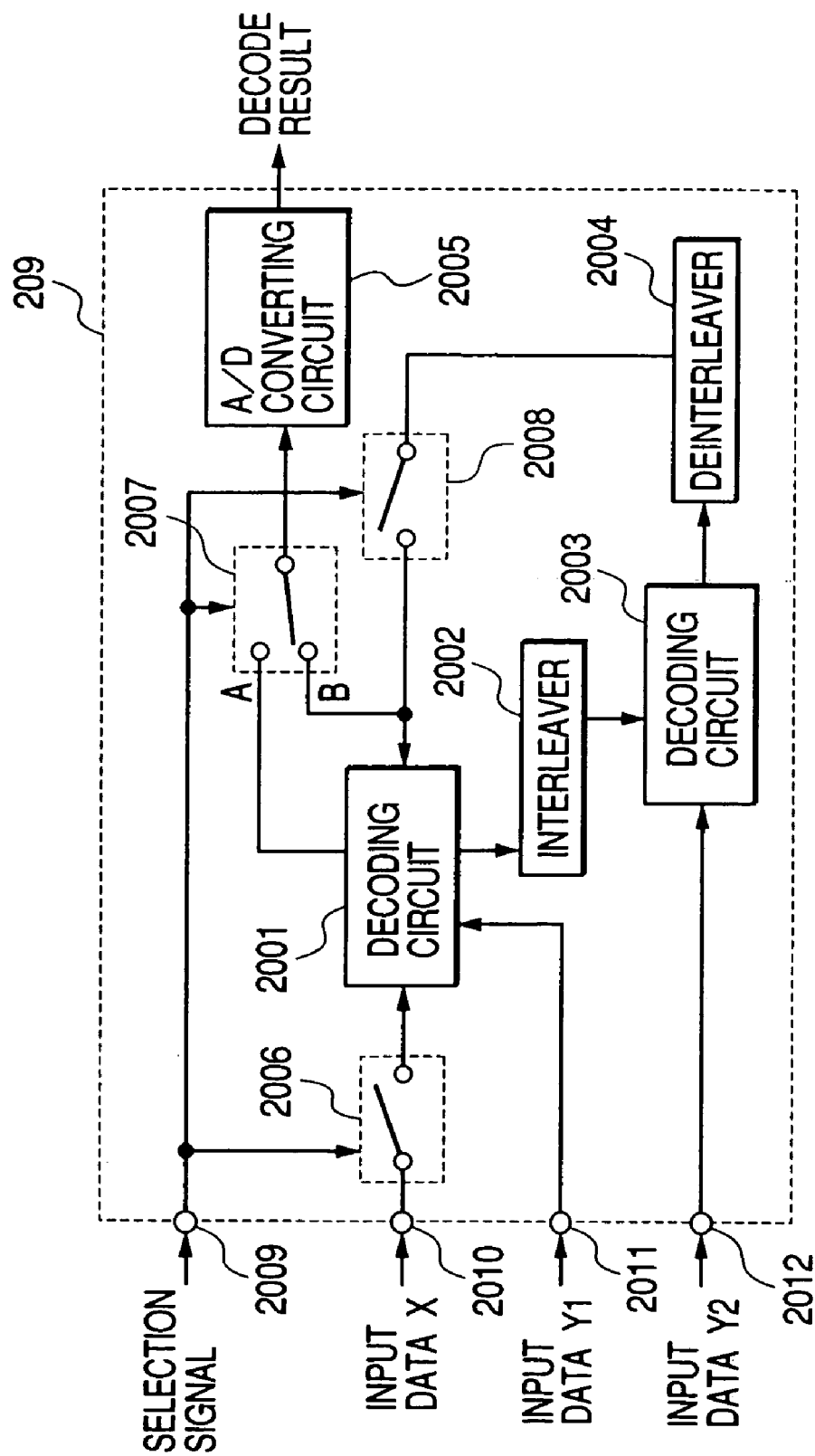
FIG. 20 is a block diagram showing another example of the error correction decoding circuit of the embodiment.

Next, another example of the error correction decoding circuit 209 of the embodiment will be described with reference to FIG. 20.

This circuit 209 is constituted of: decoding circuits 2001 and 2003; an interleaver 2002 for interleaving an output of the decoding circuit 2001 randomly or in accordance with a predetermined rule; a deinterleaver 2004 corresponding to the interleaver 2002; an analog/digital (A/D) converting circuit 2005; switches 2006 and 2008 which turn on when the selection signal is active; a switch 2007 which connects a B side when the selection signal is active and an A side when inactive; an input terminal 2009 to which the selection signal for controlling the operation of this circuit 209 is input; an input terminal 2010 to which data X is input; an input terminal 2011 to which data Y1 is input; and an input terminal 2012 to which data Y2 is input.

Similar to the above-described soft output decoding circuits 601 and 603, the decoding circuits 2001 and 2003 perform a metric calculation of input data, obtain a value (probability degree) representative of a probability that each decoded bit is "1" (or "0"), and output the decoded result containing the probability degree.

While the selective signal is active, the internal connections of the decoding circuit 2001 are changed, and the error correction decoding circuit 209 operates as an error correction decoding circuit realizing the turbo decoding algorithm shown in FIG. 6. In this case, the error correction decoding circuit 209 decodes the turbo encoded data generated by the error correction encoding circuit 208.

While the selective signal is inactive, the internal connections of the decoding circuit 2001 are changed, and the error correction decoding circuit 209 operates as an error correction decoding circuit realizing the soft output decoding algorithm shown in FIG. 4. In this case, the error correction decoding circuit 209 decodes the convolution encoded data generated by the error correction encoding circuit 208.

Figure 21:
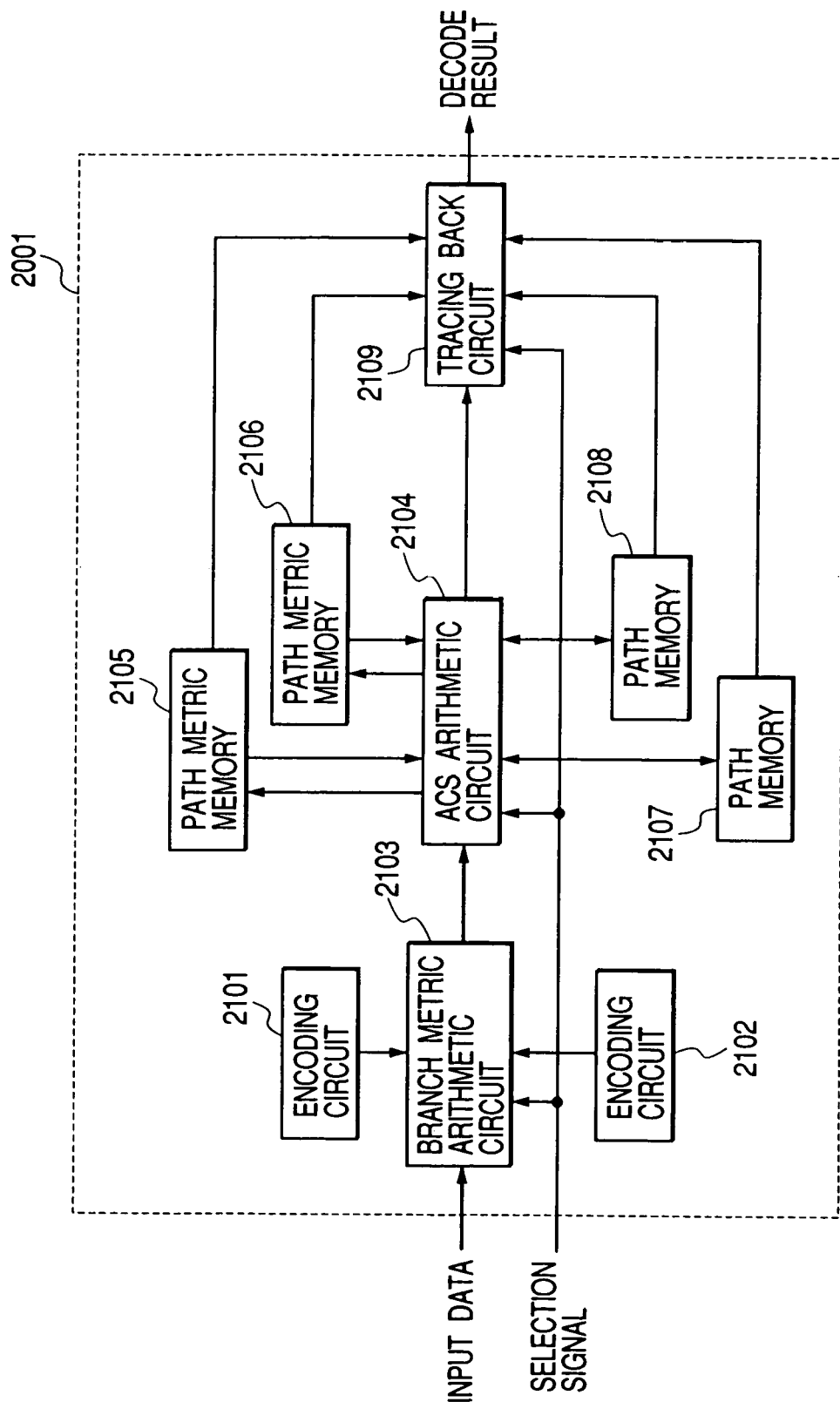
FIG. 21 is a block diagram showing an example of a decoding circuit having the error correction decoding circuit of the embodiment.

Next, an example of the internal structure of the decoding circuit 2001 will be described with reference to FIG. 21.

The decoding circuit 2001 is constituted of: encoding circuits 2101 and 2102; a branch metric arithmetic circuit 2103 for calculating a branch metric representative of a correlation intensity value between a code bit generated by each of the encoding circuits 2101 and 2102 and input data; an add-compare-select (ACS) circuit 2104; path metric memories 2105 and 2106 for storing path metric values of all paths; path memories 2107 and 2108 for storing pass selection data representative of a survival path selected by the ACS circuit 2104; and a tracing back circuit 2109 for comparing the maximum probability path with a competitive path competitive with the maximum probability path and generating probability data of the maximum probability path.

While the selection signal is active, the decoding circuit 2001 operates as one soft output decoding circuit which constitutes a turbo decoding circuit for decoding the input data by using the encoding circuit 2101, path metric memory 2105 and path memory 2107. In this case, the decoding circuit 2001 takes a circuit structure similar to the decoding circuit 2003. While the selection signal is inactive, the decoding circuit 2001 decodes, for example, Viterbi decodes, the input data by using the encoding circuit 2102, path metric memory 2106 and path memory 2108. Each of the branch metric arithmetic circuit 2103, ACS circuit 2104 and tracing back circuit 2109 is shared by a plurality of error correction decoding algorithms.

Since the decoding circuit 2001 has the above-described structure, similar to the above embodiments, the error correction decoding circuit 209 of the sixth embodiment can realize a plurality of error correction decoding algorithms having different error correction capabilities, which algorithms are switched in accordance with the selection signal.

Next, the operation of the error correction decoding circuit 209 will be described with reference to FIGS. 22A to 22C.

Figure 22:
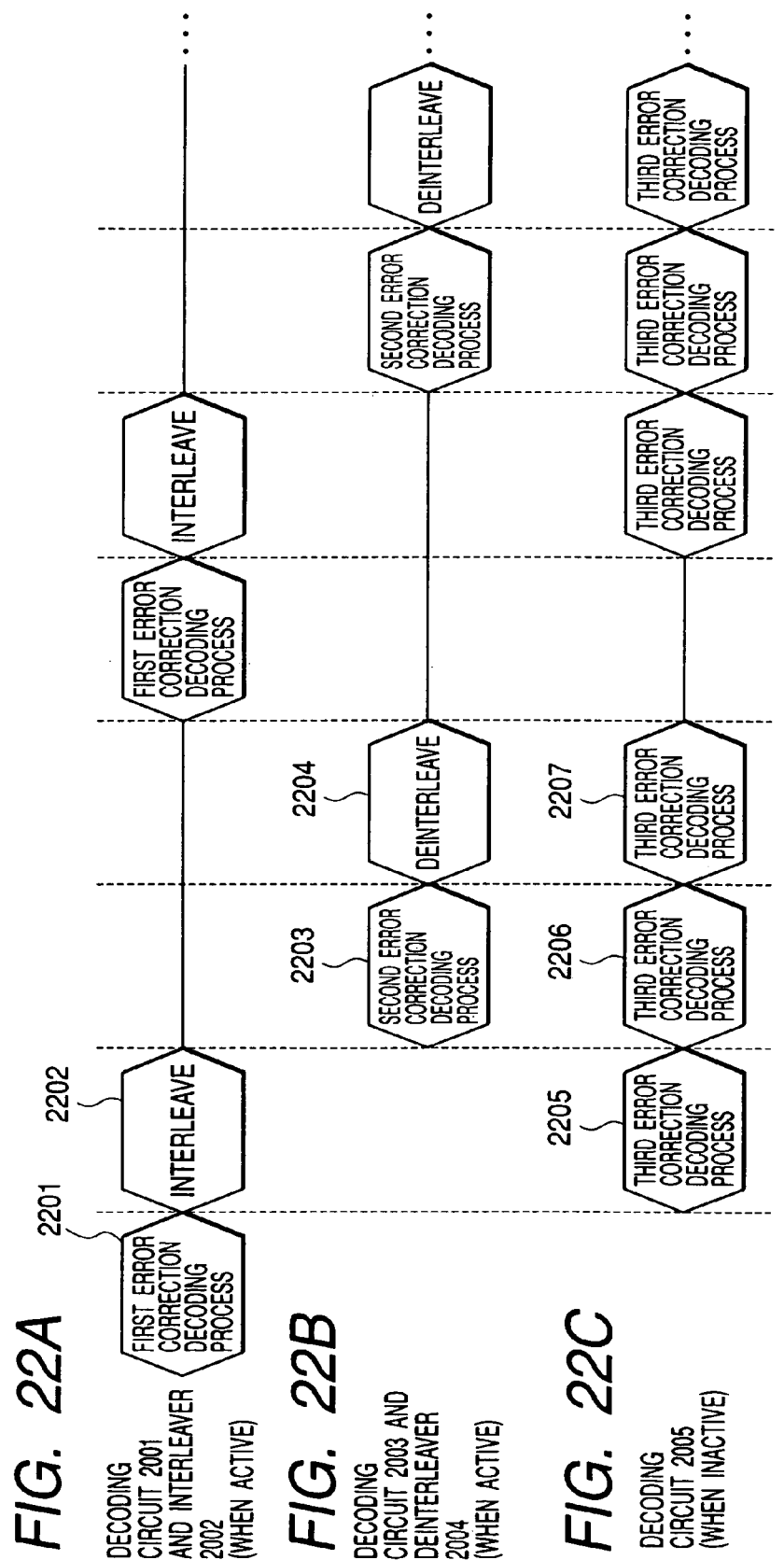
FIGS. 22A, 22B and 22C are diagrams illustrating the operations to be executed by an error correction decoding circuit of the embodiment.

FIG. 22A illustrates the operation of the decoding circuit 2001 and the interleaver 2002 while the selection signal is active, and FIG. 22B illustrates the operation of the decoding circuit 2002 and the deinterleaver 2004. FIG. 22C illustrates the operation of the decoding circuit 2001 while the selection signal is inactive.

While the selection signal is active, the error correction decoding circuit 209 receives turbo encoded data (i.e., input data X, Y1 and Y2) received or read from a storage medium. The input data X, Y1 and Y2 correspond to the output data x, y1 and y2 shown in FIG. 16 or 17.

The input data X and Y1 are supplied to the decoding circuit 2001 and decoded (a first error correction decoding process 2201 in FIG. 22A). The interleaver 2002 interleaves the decoded result by the decoding circuit 2001 and a probability degree of each bit, and supplies the interleaved result to the decoding circuit 2003 (2202 in FIG. 22A). The decoding circuit 2003 performs a soft output decoding process by using an output of the interleaver 2002 and the input data Y2 (a second error correction decoding process 2203 in FIG. 22B). The decoded result and probability degree are supplied to the deinterleaver 2004 and deinterleaved (2204 in FIG. 22B). An output of the deinterleaver 2004 is supplied via the switch 2008 to the decoding circuit 2001.

After this process is repeated a predetermined number of times, the A/D converting circuit 2005 binarizes an output of the deinterleaver 2004 and outputs the result as the decoded result of the input data X, Y1 and Y2 (i.e., turbo encoded data).

While the selection signal is inactive, the error correction decoding circuit 209 performs a process, for example, a process similar to the soft output decoding circuit 400 shown in FIG. 4.

In this case, the switch 2006 is turned off and only the input data Y1 is input to the error correction decoding circuit 209. The decoding circuit 2001 performs a soft output decoding process for the input data Y1 while the interleaver 2002, decoding circuit 2003 and deinterleaver 2004 operate, and outputs the decoded result to the switch 2007 (a third error correction decoding process 2205 to 2207 in FIG. 22C). In this case, the switch 2007 connects the A side and an output of the decoding circuit 2001 is supplied to the A/D converting circuit 2005 which binarizes an output of the decoding circuit 2001 and outputs the result as the decoded result of the input data Y1.

As described above, the error correction decoding circuit 209 of this embodiment can operate as an error correction decoding circuit realizing the above-described turbo decoding algorithm while the selection signal is active, and can operate as an error correction decoding circuit realizing the above-described soft output decoding algorithm while the selection signal is inactive. Two decoding algorithms having different error correction capabilities can be processed in parallel (in other words, time divisionally at the same time) and various functional channels can be error-correction decoded efficiently and at high speed.

By adopting the error correction decoding circuit 209 of the sixth embodiment, a portable information processing terminal such as a cell phone and a mobile computer dealing with a plurality type of error correction decoding algorithms can be made compact and inexpensive.

Seventh Embodiment

In the sixth embodiment, by sharing a portion of the error correction encoding circuit 208, the convolutional encoding algorithm for output of only the data series y1 and the turbo encoding algorithm for output of the data series x, y1 and y2 are executed in parallel. A combination of encoding algorithms which the error correction encoding circuit 208 can efficiently execute in parallel is not limited only thereto.

For example, the switch 1604 of the error correction encoding circuit 208 may made always on. In this case, the encoding circuit can realize the turbo encoding algorithm similar to the sixth embodiment while the selection signal is active, and can realize the second convolutional encoding algorithm for output of the data series of x, y1 and y2 (this algorithm having an error correction capability different from the convolutional encoding algorithm of the first embodiment) while the selection signal is inactive. In this case, the turbo encoding algorithm is processed by the timings shown in FIGS. 19A and 19B, and the second convolutional encoding algorithm is processed by the timings shown in FIG. 19C.

Although the code length becomes long, the error correction encoding circuit 208 can realize the convolutional encoding algorithm with an improved error correction capability which algorithm can be executed in parallel with the turbo encoding algorithm (in other words, two encoding algorithms can be executed time divisionally at the same time). Various functional channels can be error-correction encoded efficiently and at high speed.

Also in the sixth embodiment, by sharing a portion of the error correction decoding circuit 209, the soft output decoding algorithm for decoding only the data series Y1 and the turbo decoding algorithm for decoding the data series X, Y1 and Y2 are executed efficiently in parallel. A combination of decoding algorithms which the error correction decoding circuit 209 can efficiently execute in parallel is not limited only thereto.

For example, the switch 2006 of the error correction decoding circuit 209 may made always on. In this case, the decoding circuit can realize the turbo decoding algorithm similar to the sixth embodiment while the selection signal is active, and can realize the second soft output decoding algorithm for decoding the data series of X and Y1 (this algorithm having an error correction capability different from the soft output decoding algorithm of the first embodiment) while the selection signal is inactive. In this case, the turbo decoding algorithm is processed by the timings shown in FIGS. 22A and 22B, and the second soft output decoding is processed by the timings shown in FIG. 22C.

The error correction encoding circuit 208 can realize the soft output decoding algorithm for decoding the data series X and Y1 which algorithm can be executed in parallel with the turbo decoding algorithm (in other words, two decoding algorithms can be executed time divisionally at the same time). Various functional channels can be error-correction decoded efficiently and at high speed.

Eighth Embodiment

Another example of the decoding circuit 2001 will be described.

Figure 23:
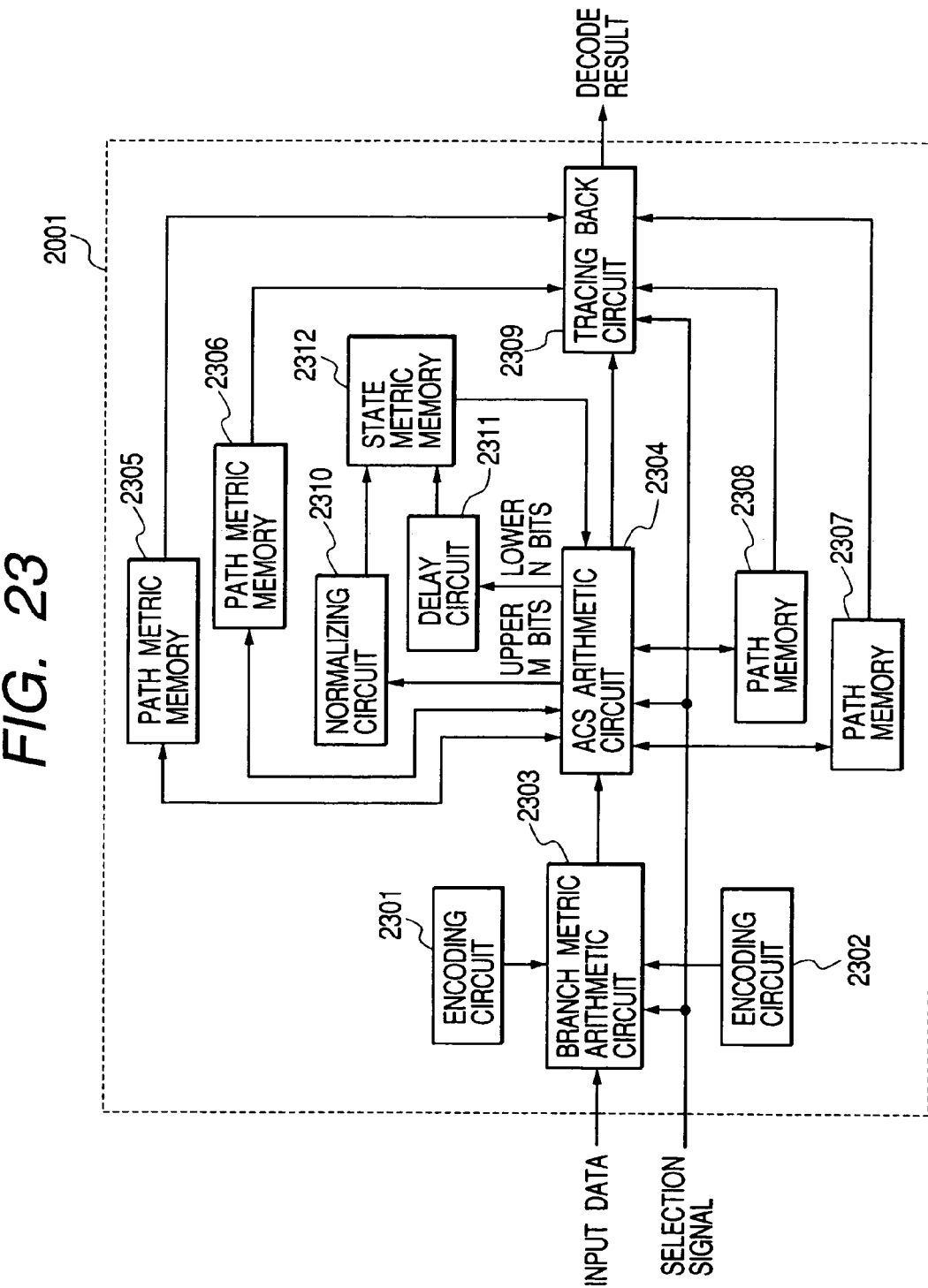
FIG. 23 is a block diagram showing another example of a decoding circuit having an error correction decoding circuit according to an embodiment of the invention.

FIG. 23 is a block diagram showing another example of a decoding circuit 2001 with the error correction decoding circuit 209 according to the eighth embodiment.

Referring to FIG. 23, reference numerals 2301 and 2302 represent an encoding circuit. Reference numeral 2302 represents a branch metric arithmetic circuit for calculating a branch metric representative of a correlation intensity value between a code bit generated by each of the encoding circuits 2301 and 2302 and input data. Reference numeral 2304 represents an add-compare-select (ACS) circuit. Reference numerals 2305 and 2306 represent a path metric memory for storing path metric values of all paths. Reference numerals 2307 and 2308 represent a path memory for storing pass selection data representative of a survival path selected by the ACS circuit 2304. Reference numeral 2309 represents a tracing back circuit for comparing the maximum probability path with a competitive path competitive with the maximum probability path and generating probability data of the maximum probability path. The encoding circuits 2301 and 2302 may be realized by tables storing a correspondence of input/output of the circuits.

In FIG. 23, reference numeral 2310 represents a normalizing circuit for normalizing a state metric of each state selected by the ACS circuit 2304 so as not to overflow the state metric. Reference numeral 2311 represents a delay circuit for delaying some of state metric values of respective states. Reference numeral 2312 represents a state metric memory for storing normalized state metric values.

While the selection signal is active, the decoding circuit 2001 operates as one soft output decoding circuit which constitutes a turbo decoding circuit for decoding the input data by using the encoding circuit 2301, path metric memory 2305 and path memory 2307. In this case, the decoding circuit 2001 takes a circuit structure similar to the decoding circuit 2003. While the selection signal is inactive, the decoding circuit 2001 decodes, for example, Viterbi decodes, the input data by using the encoding circuit 2302, path metric memory 2306 and path memory 2308. Each of the branch metric arithmetic circuit 2303, ACS circuit 2304, tracing back circuit 2309, normalizing circuit 2310, delay circuit 2311 and state metric memory 2312 is shared by a plurality of error correction decoding algorithms.

Since the decoding circuit 2001 has the above-described structure, a plurality of error correction decoding algorithms having different error correction capabilities can be realized, which algorithms are switched in accordance with the selection signal.

Next, the operation of the decoding circuit 2001 will be described with reference to FIG. 23.

The branch metric arithmetic circuit 2302 compares an output of the encoding circuit 2301 (or encoding circuit 2302) with the input data every one unit time, to obtain a branch metric of each branch. The ACS circuit 2304 reads a state metric in a past state from the state metric memory 2312 and adds the state metric in the past state to a branch metric of a branch from the past state to a present state, to obtain a path metric of the path leading to the present state.

Next, the ACS circuit 2304 compares path metric values of a plurality of paths leading to respective states, and selects a path (i.e., survival path) having the strongest correlation with the input data. This survival path is used for a new state metric in the present state, and by using this new state metric the path metric to the next state is calculated. The path metric of the selected survival path is stored in the path metric memory 2305 (or path metric memory 2306), and path selection data representative of the survival path is stored in the path memory 2307 (or path memory 2308). The path metric memory 2305 (or path metric memory 2306) also stores the path metric values of other unselected paths.

The upper m bits of the state metric of each state are supplied to the normalizing circuit 2310, and the lower n bits thereof are supplied to the delay circuit 2311. In the following description, it is assumed that the data amount of a state metric is 16 bits (m+n=16), the number of bits to be supplied to the normalizing circuit 2310 is 2 bits (m=2), and the number of bits to be supplied to the delay circuit 2311 is 14 bits (n=14).

The normalizing circuit 2310 calculates a minimum value from the upper 2 bits of a state metric of each state, and subtracts the minimum value from each of all input values to thereby normalize the input value. The normalized upper 2 bits are combined with the lower 14 bits delayed by the delay circuit 2311, and the result is stored in the state metric memory 2312.

Since the state metric of each state is normalized, the capacity of the state metric memory 2312 and the number of wiring connections necessary for calculating a state metric can be reduced considerably and a power consumption can be reduced. Furthermore, even if the data amount of a state metric is not made large, the state metric and path metric can be evaluated correctly.

The number m of bits to be supplied to the normalizing circuit 2310 is not limited to 2 bits (m=2). If the value m is set larger than 2, it is possible to further reduce the data amount of a state metric and to make very small a probability of malfunction of a normalizing process (i.e., overflow irrespective of normalization). The value m may be selected so as to become most suitable for the encoding rate of input data by an error correction encoding algorithm. For example, the branch metric value per unit time becomes larger as the encoding rate becomes lower. Therefore, by making the value m larger as the input data encoding rate becomes lower, it is possible to prevent an increase in the data amount of a state metric and to make very small a probability of malfunction of the normalizing process.

By repeating the above process, the ACS circuit 2304 eventually decides the path (i.e., maximum probability path) which is assumed to have the strongest correlation at one timing.

The tracing back circuit 2309 traces the maximum probability path by using the path selection data stored in the path memory 2307 (or path memory 2308), compares the path metric of the maximum probability path with the path metric of the competitive path with the maximum probability path, and calculates the probability degree of the maximum probability path. For example, the probability degree is calculated as a sum of halves of differences between path metric values at respective timings. The tracing back circuit 2309 outputs a product of the maximum probability path and the probability degree as a decoded result.

Next, the internal structure of the normalizing circuit 2310 of the embodiment will be described with reference to FIG. 24. In this embodiment, the decoding circuit 2001 decodes encoded data of four states. The number of states becomes different in accordance with the encoding algorithm for encoding data.

Figure 24:
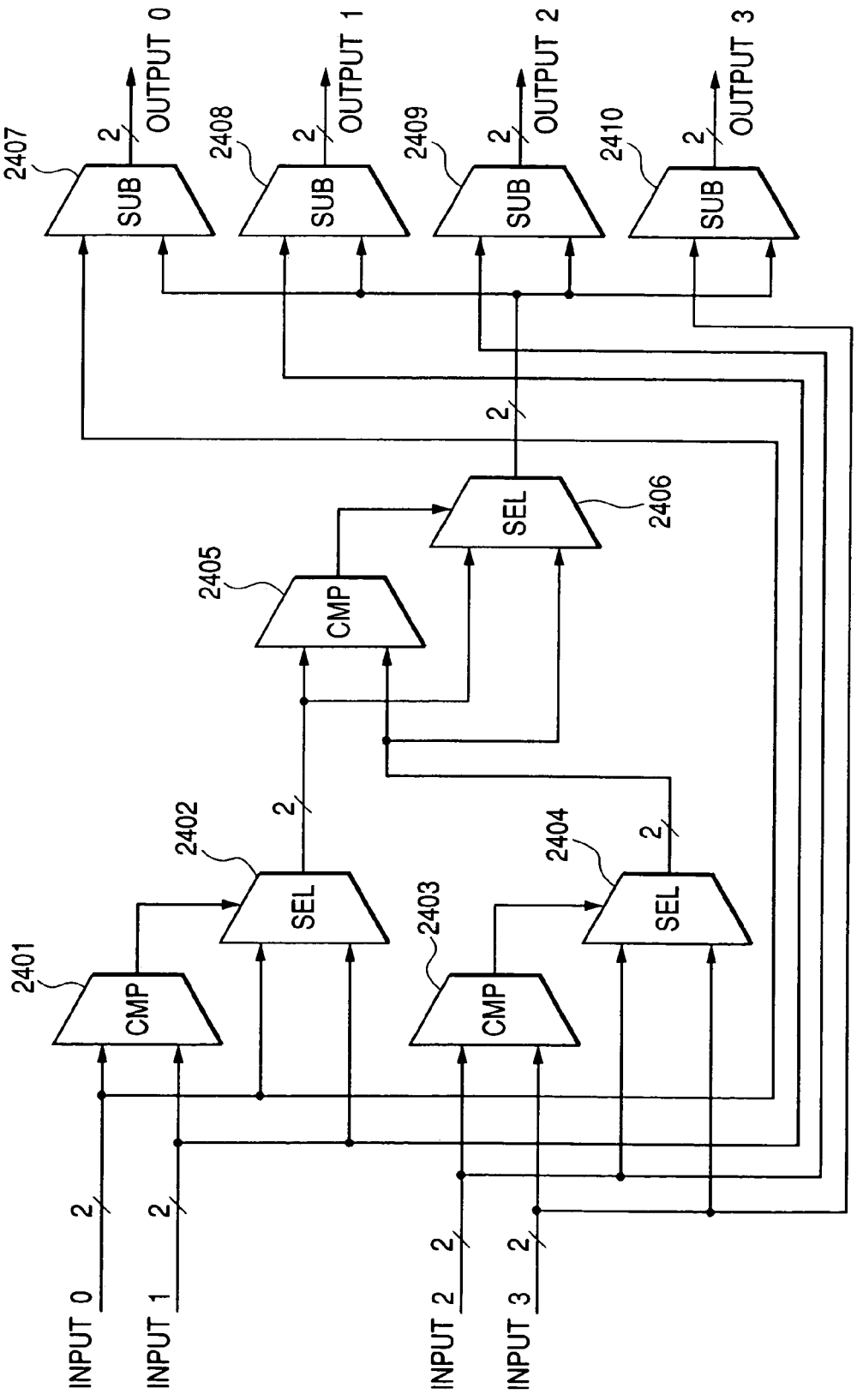
FIG. 24 is a block diagram showing an example of a normalizing circuit 2310 shown in FIG. 23.

Referring to FIG. 24, reference numerals 2401, 2403 and 2405 represent a comparator CMP, and reference numerals 2402, 2404 and 2406 represent a selector SEL. Reference numerals 2407 to 2411 represent a subtractor SUB. Each of Inputs 0 to 3 represents the upper 2 bits of a state metric of each state at one timing. Each of Outputs 0 to 3 represents the normalized result of the upper 2 bits of a state metric of each state. These values are combined with the lower 14 bits of a state metric of each state output from the delay circuit 2311, and the result is stored in the state metric memory 2312.

The upper 2 bits (Input 0) of the state metric of the first state and the upper 2 bits (Input 1) of the state metric of the second state are supplied to the compartor 2401 and selector 2402. The selector 2402 selects the upper 2 bits having a smaller value, in accordance with the comparison result by the comparator 2401, and supplies the selected value to the comparator 2405 and selector 2406.

The upper 2 bits (Input 2) of the state metric of the third state and the upper 2 bits (Input 3) of the state metric of the fourth state are supplied to the compartor 2403 and selector 2404. The selector 2404 selects the upper 2 bits having a smaller value, in accordance with the comparison result by the comparator 2403, and supplies the selected value to the comparator 2405 and selector 2406.

The selector 2406 selects the upper 2 bits having a smaller value, in accordance with the comparison result by the comparator 2405. Therefore, the selector 2406 outputs the upper 2 bits having the smallest value among Inputs 0 to 3.

An output of the selector 2406 is supplied to the subtractors 2407 to 2410. Each of the subtractors 2407 to 2410 subtracts the output (i.e., minimum input value) of the selector 2406 from Inputs 0 to 3, and outputs the results as Outputs 0 to 3.

With this structure, the normalizing circuit 2310 of this embodiment can considerably reduce the number of wiring connections necessary for calculating a state metric and suppress the power consumption.

In this embodiment, although Inputs 0 to 3 are input in parallel, they may be input serially.

Other Embodiments

The above-described embodiments may be realized as in the following.

For example, software programmed to realize each embodiment is stored in the recording medium 215 and supplied to the control unit 213 of each of the movable terminal A 102 and B 103. This control unit 213 reads the program stored in the storage medium 215 and controls the operation of each of the movable terminal A 102 and B 103 to realize the embodiment.

In this case, some of a plurality of program modules necessary for realizing a plurality of error correction encoding algorithms can be shared, and encoding processes using a plurality of error correction encoding algorithms can be executed in parallel. Also, some of a plurality of program modules necessary for realizing a plurality of error correction decoding algorithms can be shared, and decoding processes using a plurality of error correction decoding algorithms can be executed in parallel. Accordingly, the number of programs can be reduced and the development time can be shortened, and a plurality of error correction encoding and decoding algorithms can be realized efficiently and at high speed.

The storage medium 215 for supplying software may be a floppy disk, a hard disk, an optical disk, a magnetooptical disk, a CD-ROM, a CD-R, a magnetic tape, a nonvolatile memory card, a ROM or the like.

The software may be software stored in the memory medium 215 or software supplied from the external and stored in the storage medium 215.

The invention may be embodied in other specific forms without departing from the essential characteristics thereof.

In the above-described embodiments, although the error correction encoding circuit 208 and error correction decoding circuit 209 are applied to the movable terminals A 102 and B 103, they may be applied to other radio communications terminals such as a base station and a fixed station.

In the above embodiments, a partial circuit of the error correction encoding circuit 208 is shared and two error correction encoding algorithms having different error correction capabilities are executed in parallel. Three or more error correction encoding algorithms having different error correction capabilities may also be executed in parallel. For example, a plurality of convolutional encoding algorithms having different error correction capabilities and a plurality of turbo encoding algorithms having different error correction capabilities can be executed in parallel.

Also in the above embodiments, a partial circuit of the error correction decoding circuit 209 is shared and two error correction decoding algorithms having different error correction capabilities are executed in parallel. Three or more error correction decoding algorithms having different error correction capabilities may also be executed in parallel. For example, a plurality of soft output decoding algorithms having different error correction capabilities and a plurality of turbo decoding algorithms having different error correction capabilities can be executed in parallel. In addition to the soft output decoding algorithm, the maximum probability decoding algorithm such as a maximum a posterior probability decoding (MAP decoding) may also be executed.

Therefore, the above-mentioned embodiments are merely examples in all respects, and must be construed to limit the invention.

The scope of the present invention is defined by the scope of the appended claims, and is not limited at all by the specific descriptions of this specification. Furthermore, all the modifications and changed belonging to equivalents of the claims are considered to fall within the scope of the present invention.

What is claimed is:

1. An encoding apparatus, comprising:
   a first encoding unit adapted to encode inputted data;
   an interleaving unit adapted to interleave the inputted data; and
   a second encoding unit adapted to encode an output of said interleaving unit,
   wherein said encoding apparatus executes a first encoding algorithm using said first encoding unit,
   wherein said encoding apparatus executes a second encoding algorithm using said first encoding unit, said interleaving unit and said second encoding unit, and
   wherein said encoding apparatus shares said first encoding unit when said encoding apparatus executes the first and second encoding algorithms in parallel.

2. An encoding apparatus according to claim 1, wherein the first encoding algorithm is adapted to use convolutional coding, and the second encoding algorithm is adapted to use turbo coding.

3. An encoding apparatus according to claim 1, wherein the second encoding algorithm is adapted to use turbo coding.

4. An encoding apparatus according to claim 1, wherein the first encoding algorithm is adapted to use non-recursive convolutional encoding, and the second encoding algorithm is adapted to use recursive convolutional encoding.

5. An encoding apparatus according to claim 1, wherein a constraint length of encoded data encoded by the first encoding algorithm is different from a constraint length of encoded data encoded by the second encoding algorithm.

6. An encoding apparatus according to claim 1, further comprising:
   a selecting unit adapted to select the first or second encoding algorithm in accordance with a type of inputted data.

7. An encoding apparatus according to claim 1, further comprising:

a radio transmitting unit adapted to transmit encoded data encoded by the first or second encoding algorithm.

8. A decoding apparatus, comprising:
   a first decoding unit adapted to decode inputted data;
   a first interleaving unit adapted to interleave an output of said first decoding unit;
   a second decoding unit adapted to decode an output of said first interleaving unit; and
   a second interleaving unit adapted to interleave an output of said second decoding unit,
   wherein said decoding apparatus executes a first decoding algorithm using said first decoding unit,
   wherein said decoding apparatus executes a second decoding algorithm using said first and second decoding units and said first and second interleaving units, and
   wherein said decoding apparatus shares said first decoding unit when said decoding apparatus executes the first and second decoding algorithms in parallel.

9. A decoding apparatus according to claim 8, wherein the first decoding algorithm is adapted to use soft output decoding, and the second decoding algorithm is adapted to use turbo decoding.

10. A decoding apparatus according to claim 8, wherein the second decoding algorithm is adapted to use turbo decoding.

11. A decoding apparatus according to claim 8, wherein said first decoding unit normalizes a state metric value.

12. A decoding apparatus according to claim 8, wherein a constraint length of encoded data which will be decoded by the first decoding algorithm is different from a constraint length of encoded data which will be decoded by the second decoding algorithm.

13. A decoding apparatus according to claim 8, further comprising:
   a selecting unit adapted to select the first or second decoding algorithm in accordance with a type of inputted data.

14. A decoding apparatus according to claim 8, further comprising:
   a radio receiving unit adapted to receive encoded data which will de decoded by the first or second decoding algorithms.

* * * * *

UNITED STATES PATENT AND TRADEMARK OFFICE
CERTIFICATE OF CORRECTION

| | | |
|---|---|---|
| PATENT NO. | : 7,076,720 B1 | |
| APPLICATION NO. | : 09/577980 | |
| DATED | : July 11, 2006 | |
| INVENTOR(S) | : Jun Yoshida et al. | |

It is certified that error appears in the above-identified patent and that said Letters Patent is hereby corrected as shown below:

COLUMN 1:

Line 18, "even" should read --even if--.

COLUMN 9:

Line 58, "703:" should read --703;--.

COLUMN 11:

Line 65, "y1" (second occurrence) should read --y2--.

COLUMN 17:

Line 59, "adders 1107" should read --adders 1307--.

COLUMN 18:

Line 67, "algorithms. Next," should read --algorithms. ¶ Next,--.

COLUMN 24:

Line 56, "may made" should read --may be made to be--.

COLUMN 25:

Line 18, "may made" should read --may be made to be--.

UNITED STATES PATENT AND TRADEMARK OFFICE
CERTIFICATE OF CORRECTION

PATENT NO. : 7,076,720 B1
APPLICATION NO. : 09/577980
DATED : July 11, 2006
INVENTOR(S) : Jun Yoshida et al.

It is certified that error appears in the above-identified patent and that said Letters Patent is hereby corrected as shown below:

<u>COLUMN 27</u>:

Line 54, "compartor 2403" should read --comparator 2403--.

<u>COLUMN 29</u>:

Line 9, "changed" should read --changes--.

Signed and Sealed this

Sixteenth Day of September, 2008

JON W. DUDAS
*Director of the United States Patent and Trademark Office*